(12) United States Patent
Mizukami

(10) Patent No.: US 9,383,626 B2
(45) Date of Patent: Jul. 5, 2016

(54) IMAGING APPARATUS, FOCUS CONTROL METHOD, AND PROGRAM

(71) Applicant: Sony Corporation, Tokyo (JP)

(72) Inventor: Akifumi Mizukami, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 149 days.

(21) Appl. No.: 13/851,500

(22) Filed: Mar. 27, 2013

(65) Prior Publication Data

US 2013/0265473 A1    Oct. 10, 2013

(30) Foreign Application Priority Data

Apr. 6, 2012    (JP) .................................. 2012-087172

(51) Int. Cl.
| | |
|---|---|
| G03B 13/20 | (2006.01) |
| G03B 13/36 | (2006.01) |
| H04N 5/232 | (2006.01) |
| G02B 7/28 | (2006.01) |

(52) U.S. Cl.
CPC .............. *G03B 13/20* (2013.01); *G02B 7/282* (2013.01); *G03B 13/36* (2013.01); *H04N 5/23212* (2013.01); *H04N 5/23293* (2013.01)

(58) Field of Classification Search
CPC ...................... H04N 5/23212; H04N 5/23219
USPC .................. 348/345, 346, 349, 350, 353–356
See application file for complete search history.

(56) References Cited

U.S. PATENT DOCUMENTS

| | | | |
|---|---|---|---|
| 8,648,960 B2 * | 2/2014 | Lee | 348/345 |
| 8,817,122 B2 * | 8/2014 | Okamura | 348/222.1 |
| 2006/0290932 A1 * | 12/2006 | Kawanami | 356/370 |
| 2007/0030381 A1 * | 2/2007 | Maeda | 348/345 |
| 2007/0064145 A1 * | 3/2007 | Sugimoto | 348/345 |
| 2007/0242942 A1 * | 10/2007 | Nozaki et al. | 396/123 |
| 2008/0136958 A1 * | 6/2008 | Nakahara | 348/345 |
| 2009/0002516 A1 * | 1/2009 | Suzuki et al. | 348/223.1 |
| 2009/0207298 A1 * | 8/2009 | Kawanishi | 348/345 |
| 2010/0321515 A1 * | 12/2010 | Imamura | 348/222.1 |
| 2012/0057062 A1 * | 3/2012 | Hamada et al. | 348/333.02 |
| 2014/0043522 A1 * | 2/2014 | Hamano | 348/349 |
| 2014/0139724 A1 * | 5/2014 | Yasuda | 348/349 |
| 2014/0176783 A1 * | 6/2014 | Shibagami | 348/349 |

FOREIGN PATENT DOCUMENTS

| | | |
|---|---|---|
| JP | 2006058405 A | 3/2006 |
| JP | 2010237400 A | 10/2010 |

* cited by examiner

*Primary Examiner* — Timothy J Henn
(74) *Attorney, Agent, or Firm* — CHIP Law Group

(57) ABSTRACT

An imaging apparatus which includes a range-finding region arrangement unit which arranges range-finding regions of which region sizes are different by hierarchizing thereof, a range-finding region selection unit which selects the range-finding region in a predetermined order from the arranged range-finding regions, and a control unit which performs a focusing operation by generating an evaluation value which denotes degree of focusing with respect to the range-finding regions which are selected in the range-finding region selection unit, and controlling a position of a focus lens based on the evaluation value.

13 Claims, 18 Drawing Sheets

IMAGING APPARATUS, FOCUS CONTROL METHOD, AND PROGRAM

CROSS-REFERENCE TO RELATED APPLICATION

The present application claims priority from Japanese Patent Application No. JP 2012-087172 filed in the Japanese Patent Office on Apr. 6, 2012, the entire content of which is incorporated herein by reference.

BACKGROUND

The present technology relates to an imaging apparatus, a focus control method, and a program, and is to be able to increase focusing precision.

In the related art, it is generally possible to perform an autofocus operation in an imaging apparatus. In the autofocus operation, for example, a range-finding frame which denotes which portion of a subject is to be the subject of focusing is displayed in a viewfinder, and a focus control is performed using a contrast detection method, or a phase difference detection method so that focusing is performed in the range-finding frame.

In addition, in Japanese Unexamined Patent Application Publication No. 2006-58405, a technology is disclosed in which focusing to a specified portion of a subject can be easily performed when performing close-up photography by switching a size of a range-finding frame between a normal mode and a macro mode. Further, in Japanese Unexamined Patent Application Publication No. 2010-237400, a technology is disclosed in which a focus detection is performed using a phase difference detection method by providing a focus detection pixel, for example, a pair of phase difference AF pixels in an imaging element.

SUMMARY

Incidentally, when switching the size of a range-finding frame according to the imaging mode, focus on a subject with low contrast, or the like, becomes difficult in the imaging mode in which the range-finding frame is set to be small. For example, when an autofocus operation starts with a significant blur, it becomes a state in which contrast of an image is lost, and it is not possible to obtain an evaluation value corresponding to contrast when the range-finding frame is decreased. Accordingly, there is a concern that focusing time may be drastically increased when trying to find a point which can measure a distance while moving a focus lens. In addition, there is also a concern that it may be difficult to focus on a desired subject when the subject is moving since the desired subject is out of the range-finding frame or when blurring occurs in an imaging apparatus, or the like, if the size of the range-finding frame is too small.

It is desirable to provide an imaging apparatus, a focusing control method, and a program which can improve focus precision.

According to a first embodiment of the present technology, there is provided an imaging apparatus which includes a range-finding region arrangement unit which arranges range-finding regions of which sizes of region are different by hierarchizing thereof; a range-finding region selection unit which selects the range-finding region in a predetermined order from the arranged range-finding regions; and a control unit which performs a focusing operation by generating an evaluation value which denotes a degree of focusing with respect to the range-finding regions which are selected in the range-finding region selection unit, and controlling a position of a focus lens based on the evaluation value.

In the present technology, the range-finding regions of which different region sizes are arranged by being hierarchized. The arranged range-finding regions are selected in a predetermined order. For example, first, a range-finding region of which a region size is largest is selected. An evaluation value denoting a degree of focusing is generated with respect to the selected range-finding region, and a focusing operation is performed by controlling a position of a focus lens based on the generated evaluation value. Thereafter, a range-finding region with a different size of region is selected, for example, in order of a large size of region, and a focusing operation is performed by controlling the position of the focus lens based on an evaluation value which is generated in each selected range-finding region. The control of the position of the focus lens is performed each time an evaluation value is generated by generating the evaluation value each time a range-finding region is selected. Alternatively, the control of the focus lens is performed based on an evaluation value in a range-finding region of the smallest sized region in the generated evaluation values, by generating an evaluation value in each range-finding region.

A range-finding region is arranged based on a position which is instructed by a user. In addition, a range-finding region of the largest sized region may be set by a user. Further, range-finding regions of which sizes of region are different may also be arranged in the range-finding region of which the size of region is the largest, based on an image recognition result with respect to an image in the range-finding region of which the size of region is the largest.

Generating an evaluation value is performed using a signal of a focusing detection pixel which is provided in an imaging element. When a focusing detection module is provided, arrangements of range-finding regions of different region sizes is performed by setting a range-finding region of the focusing detection module as the range-finding region of the largest sized region and when the largest region size is selected, the generation of the evaluation value is performed using a detection signal which is generated using the focusing detection module.

In a display unit which performs an image display, a focusing display is performed in which a range-finding region of the largest region size or a range-finding region of the smallest region size in a generated evaluation value is identifiably displayed on a displayed image.

Further, when a movement of an imaging apparatus is detected while measuring a distance in the selected range-finding region, an evaluation value which is generated in the selected range-finding region becomes invalid.

According to a second embodiment of the present technology, there is provided a focus control method which includes arranging range-finding regions of which sizes of regions are different by hierarchizing thereof; selecting a range-finding region in a predetermined order from the arranged range-finding regions; and performing a focusing operation by generating an evaluation value denoting degree of focusing with respect to the selected range-finding region, and controlling a position of a focus lens based on the evaluation value.

According to a third embodiment of the present technology, there is provided a program which causes a computer to execute a focus control including, procedures of arranging range-finding regions of which sizes of regions are different by hierarchizing thereof; selecting a range-finding region in a predetermined order from the arranged range-finding regions; and performing a focusing operation by generating an evaluation value denoting degree of focusing with respect to the selected range-finding region, and controlling a position of a focus lens based on the evaluation value.

In addition, the program according to the present technology is a program which can be provided through a storage medium which is provided using a computer-readable format with respect to a general-purpose computer which can execute various programs, or codes; a communication medium, for example, a storage medium such as an optical disc, a magnetic disk, a semiconductor memory, or the like; or a communication medium such as a network. By providing such a program using a computer-readable format, processing corresponding to the program is executed on the computer.

According to the present technology, range-finding regions of different region sizes are arranged by being hierarchized, and a range-finding region is selected in a predetermined order from the arranged range-finding regions. In addition, an evaluation value denoting degree of focusing with respect to the selected range-finding regions is generated, and a focusing operation is performed by controlling a position of a focus lens based on the evaluation value. In this manner, since generation of the evaluation value is performed in a plurality of region sizes, it is possible to perform a focusing operation with respect to a range-finding region of a small size region, and to improve focus precision compared to a case in which a range-finding region has a constant region size.

DETAILED DESCRIPTION OF EMBODIMENTS

Figure 1:
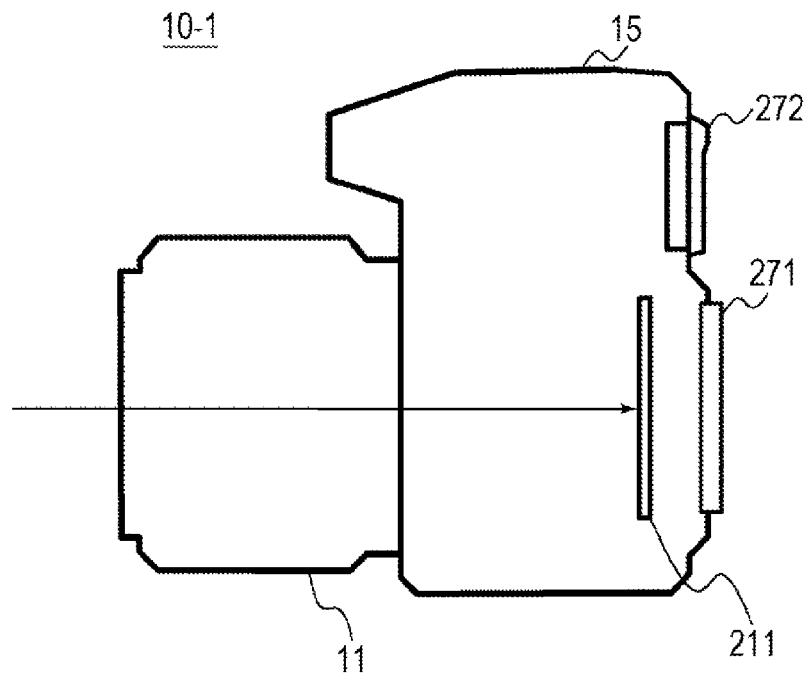
FIG. 1 is a cross-sectional schematic diagram of an imaging apparatus according to a first embodiment.

Hereinafter, embodiments of the present technology will be described. In addition, descriptions will be made in the following order.
1. First Embodiment
   1-1. Configuration of imaging apparatus
   1-2. Focus control operation of imaging apparatus
   1-2-1. First focus control operation
   1-2-2. Second focus control operation
   1-2-3. Third focus control operation
   1-2-4. Fourth focus control operation
   1-2-5. Fifth focus control operation
   1-2-6. Sixth focus control operation
   1-2-7. Other focus control operations
2. Second Embodiment
   2-1. Configuration of imaging apparatus
   2-2. Focus control operation of imaging apparatus 1. First Embodiment In a first embodiment, a case in which a focus control operation is performed using a focusing detection pixel which is provided in an imaging element, for example, a signal of a pair of phase difference AF pixels will be described.
1-1. Configuration of Imaging Apparatus FIG. 1 illustrates a cross-sectional schematic diagram according to the first embodiment. An imaging apparatus 10-1 includes a camera body 15, and an interchangeable lens 11 which is detachable from the camera body 15.

The interchangeable lens 11 functions as a photographing optical system for guiding object light to an imaging element 211 which is arranged in the camera body 15. The interchangeable lens 11 is provided with a lens unit which is configured by a focus lens for adjusting focus, a zoom lens for performing variable magnification, or the like, a diaphragm for adjusting a light amount, or the like.

The imaging element 211 or the like is provided in the camera body 15. As the imaging element 211, a CMOS image sensor (Complementary Metal Oxide Semiconductor Image Sensor) in which a plurality of pixels which are configured by having, for example, a photo diode are two-dimensionally arranged in a matrix, and a color filter is arranged on a light receiving surface of each pixel is used. In addition, a focus detection pixel, for example, a plurality of pair of phase difference AF pixels are provided in the imaging element.

A display unit 27 is provided on the rear surface of the camera body 15. As the display unit 27, a monitor unit 271, or a viewfinder 272 is provided. The display unit 27 is configured using a liquid crystal display element, or an EL (Electro Luminescence) display element, or the like. The display unit 27 performs a display of an image which is imaged in the imaging apparatus 10-1, a reproducing display of a recorded image, or the like, and displays functions which are mounted on the imaging apparatus 10-1, mode setting screens, or the like. In addition, the display unit 27 also performs a display of the live view (preview) or the like when determining composition (framing) before performing main photographing.

Figure 2:
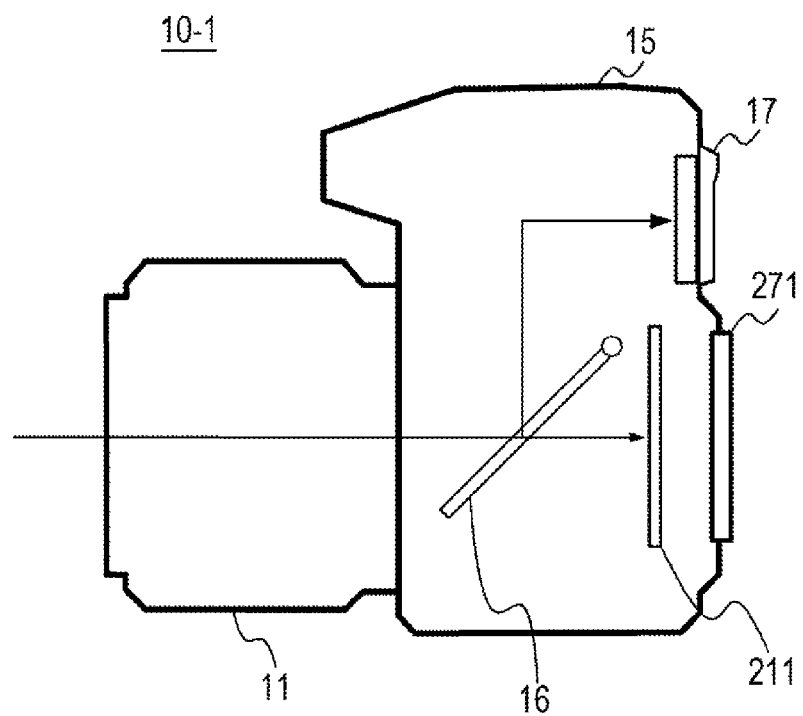
FIG. 2 is a cross-sectional schematic diagram of another imaging apparatus according to the first embodiment.

FIG. 2 illustrates a cross-sectional schematic diagram of another imaging apparatus according to the first embodiment.

An imaging apparatus 10-1 includes a camera body 15, and an interchangeable lens 11 which is detachable from the camera body 15.

In the imaging apparatus 10-1, a semitransparent curtain (half mirror) 16, an imaging element 211, and the like are provided in the camera body 15. The semitransparent curtain 16 causes a part of object light which has passed through the interchangeable lens 11 to be transmitted, and to be input to the imaging element 211, and on the other hand, light other than that is caused to be output from a viewfinder 17 via a pentaprism (not shown), or the like.

Figure 3:
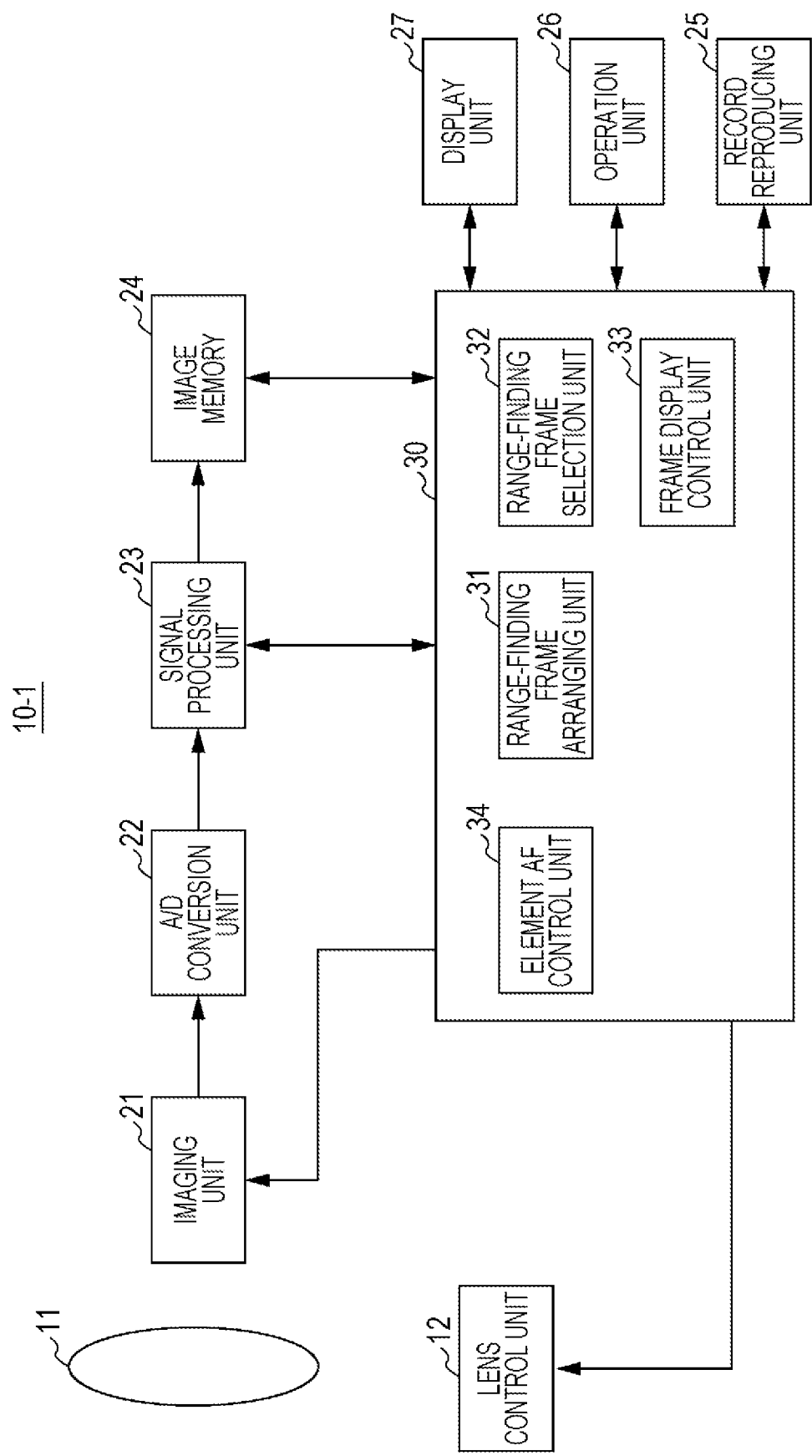
FIG. 3 is a block diagram which illustrates an electrical configuration of the imaging apparatus according to the first embodiment.

FIG. 3 is a block diagram which illustrates an electrical configuration of the imaging apparatus according to the first embodiment. A lens control unit 12 is provided in the interchangeable lens 11. In addition, an imaging unit 21, an A/D conversion unit 22, a signal processing unit 23, an image memory 24, a record reproducing unit 25, n operation unit 26, a display unit 27, and a camera control unit 30 are provided in the camera body 15.

The lens control unit 12 of the interchangeable lens 11 performs a communication with the camera control unit 30 of the camera body 15, and transmits an information signal denoting, for example, a focus distance, a lens position, or the like of the interchangeable lens 11 to the camera control unit 30. In addition, the lens control unit 12 moves the focus lens by receiving, for example, a driving signal of a focus lens from the camera control unit 30, and driving the focus lens based on the received driving signal.

The imaging unit 21 of the camera body 15 includes the above described imaging element 211, and an element driving unit (not shown) which drives the imaging element 211. The imaging element 211 is formed by the CMOS image sensor, or the like, as described above, and is performed with an operation control such as an exposing operation of the imaging element 211, reading out of a signal of each pixel in the imaging element 211, or the like, by the element driving unit. The element driving unit generates a predetermined timing signal or the like based on a reference clock which is output from the camera control unit 30, outputs the signal or the like to the imaging element 211, and controls an operation of the imaging element 211. In addition, the imaging unit 21 performs predetermined analog signal processing with respect to an analog image signal which is output from the imaging element 211, for example, noise removing processing, gain adjusting, or the like, and outputs the image signal after the analog signal processing to the A/D conversion unit 22.

The A/D conversion unit 22 outputs the analog image signal which is supplied from the imaging unit 21 to the signal processing unit 23 by converting the signal to a digital image signal.

The signal processing unit 23 performs various camera signal processing with respect to the image signal which is supplied from the A/D conversion unit 22. For example, the signal processing unit 23 performs processing such as white balance adjusting, a gamma correction, or the like, and outputs the processed image signal to an image memory 24.

The image memory 24 is a memory which temporarily stores image data which is output from the signal processing unit 23 when it is an imaging mode, and is used as a work area for performing predetermined processing with respect to the image data using the camera control unit 30. In addition, when it is in a reproducing mode, the image data which is read out from a record reproducing unit 25 is temporarily stored.

The record reproducing unit 25 records an image signal to a recording medium, for example, a detachable memory card or the like. In addition, the record reproducing unit 25 reads out the image signal which is recorded in the recording medium.

The operation unit 26 includes a shutter button, various operation switches, and the like, generates an operation signal corresponding to a user operation, and outputs the operation signal to the camera control unit 30.

The display unit 27 is configured using a liquid crystal display element, or an EL (Electro Luminescence) display element, or the like, and performs displays of an imaged image and a recorded image, a display of a live view (preview), displays of functions, set screens, or the like.

The camera control unit 30 is configured using a CPU (Central Processing Unit), a ROM (Read Only Memory) which stores a control program or the like, a RAM (Random Access Memory) which temporarily stores data, or the like. The CPU executes a control program which is stored in the ROM, and controls each unit so that the operation of the imaging apparatus 10-1 becomes an operation corresponding to the user operation.

Figure 4:
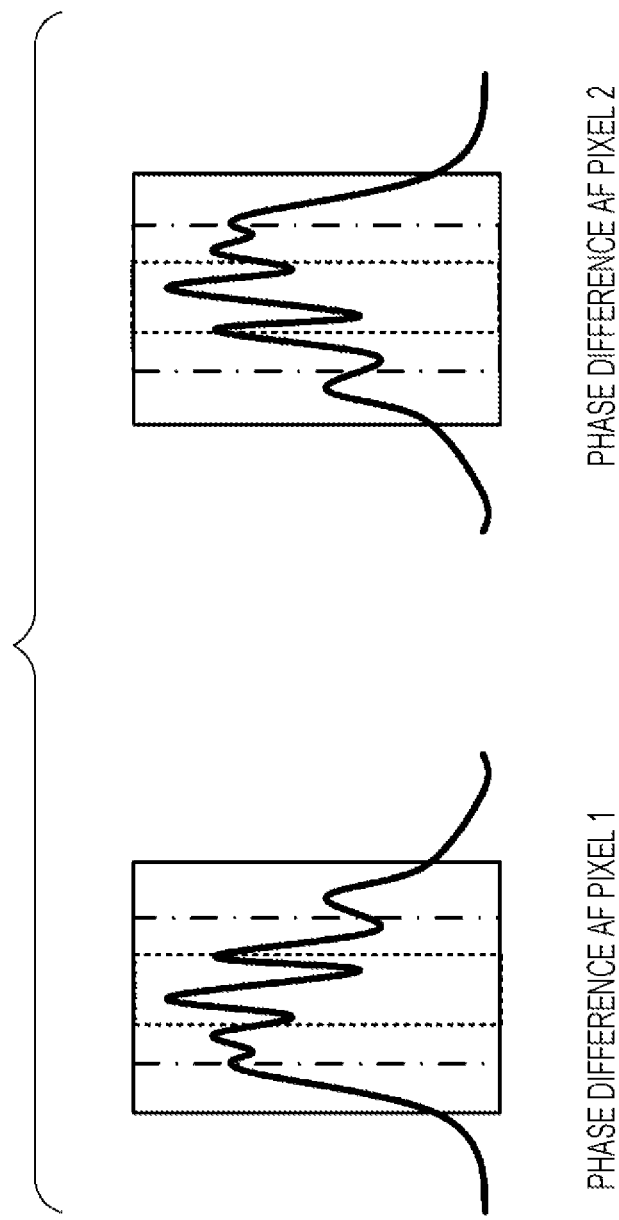
FIG. 4 is a diagram which describes a phase difference detection method.

In addition, the camera control unit 30 performs a focus control using signals from the pair of phase difference AF pixels which are provided in the imaging element. In the focus control using the signals from the pair of phase difference AF pixels, that is, the focus control using the phase difference detection method, a quantity of focus errors are determined from a phase difference of images between the phase difference AF pixels based on the signals from the pair of phase difference AF pixels. For example, as illustrated in FIG. 4, the quantity of focus error is determined from a phase difference of images of a phase difference AF pixel 1 and a phase difference AF pixel 2. In such a phase difference detection method, it is possible to perform the focus control with high precision since a close subject and a far subject are not mixed in a range-finding region when the range-finding region is set to be small. For example, in FIG. 4, when the phase difference is calculated from a range which is denoted by one dot and a dashed line by making the range smaller than the range which is denoted by a solid line, or from a range which is denoted by a dotted line which is smaller than the range which is denoted by the dotted line, it is possible to increase the focus precision. Accordingly, the camera control unit 30 arranges the range-finding regions of region sizes which are different by hierarchizing thereof, selects a range-finding region from the arranged range-finding regions, and generates an evaluation value denoting degree of focusing with respect to the selected range-finding region. In addition, it is possible to increase the focus precision by controlling a position of the focus lens based on the generated evaluation value which is generated with respect to the range-finding region of the smallest sized region, and performing a focusing operation.

In order to perform the focusing control, the camera control unit 30 includes, for example, a range-finding frame arranging unit 31, a range-finding frame selection unit 32, a frame display control unit 33, and an element AF control unit 34. In addition, the range-finding frame arranging unit 31, the range-finding frame selection unit 32, the frame display control unit 33, and the element AF control unit 34 correspond to a range-finding region arranging unit, a range-finding region selection unit, and a region display control unit, and a control unit in claims.

The range-finding frame arranging unit 31 arranges a range-finding frame denoting a range-finding region according to a user operation. In addition, the range-finding frame arranging unit 31 arranges the range-finding frames of which the range-finding regions are different by hierarchizing thereof. For example, the range-finding frames are arranged by being hierarchized by providing one or a plurality of range-finding frames of which the range-finding regions are small in the range-finding frames. In addition, it is possible to arrange range-finding frames of different sizes in the range-finding regions by hierarchizing thereof, by providing a range-finding region of a large size so as to include the range-finding frame.

Figure 5:
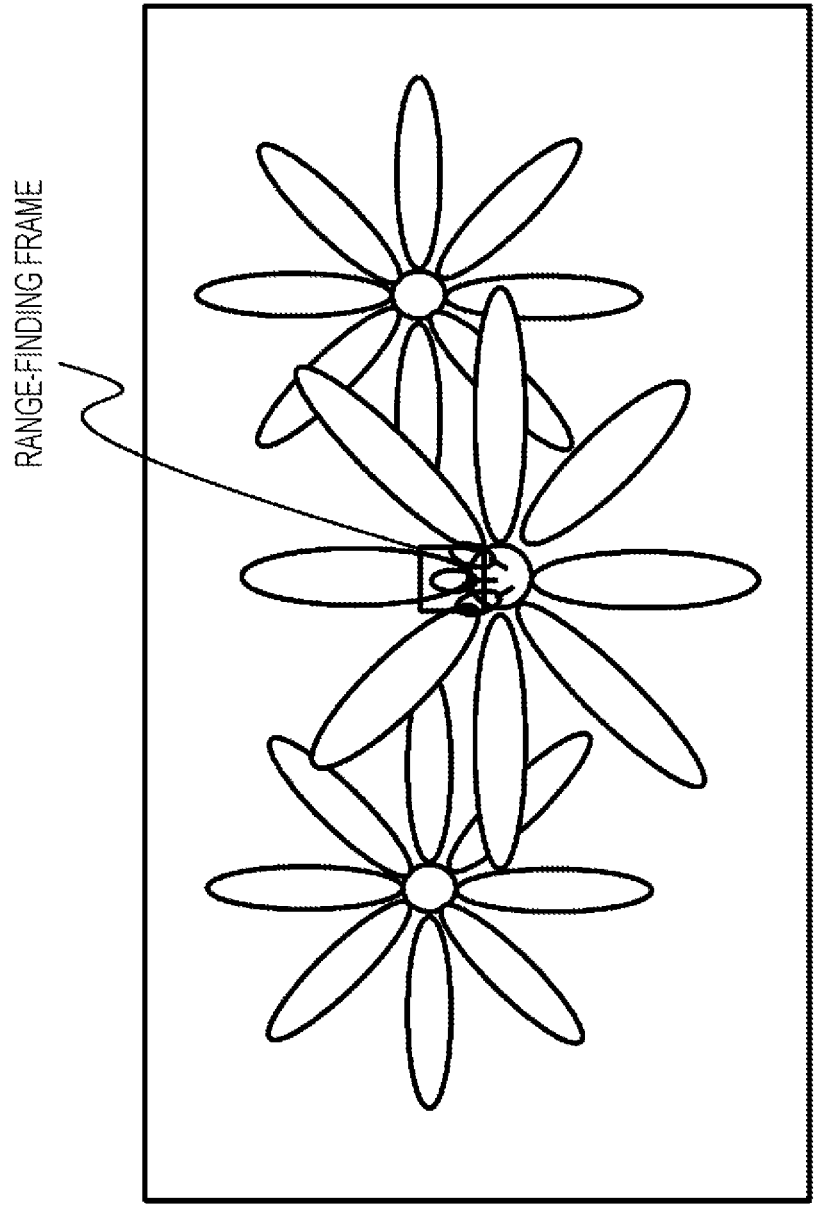
FIG. 5 is a diagram which exemplifies a range-finding frame (normal frame) which is set by a user.
Figure 6:
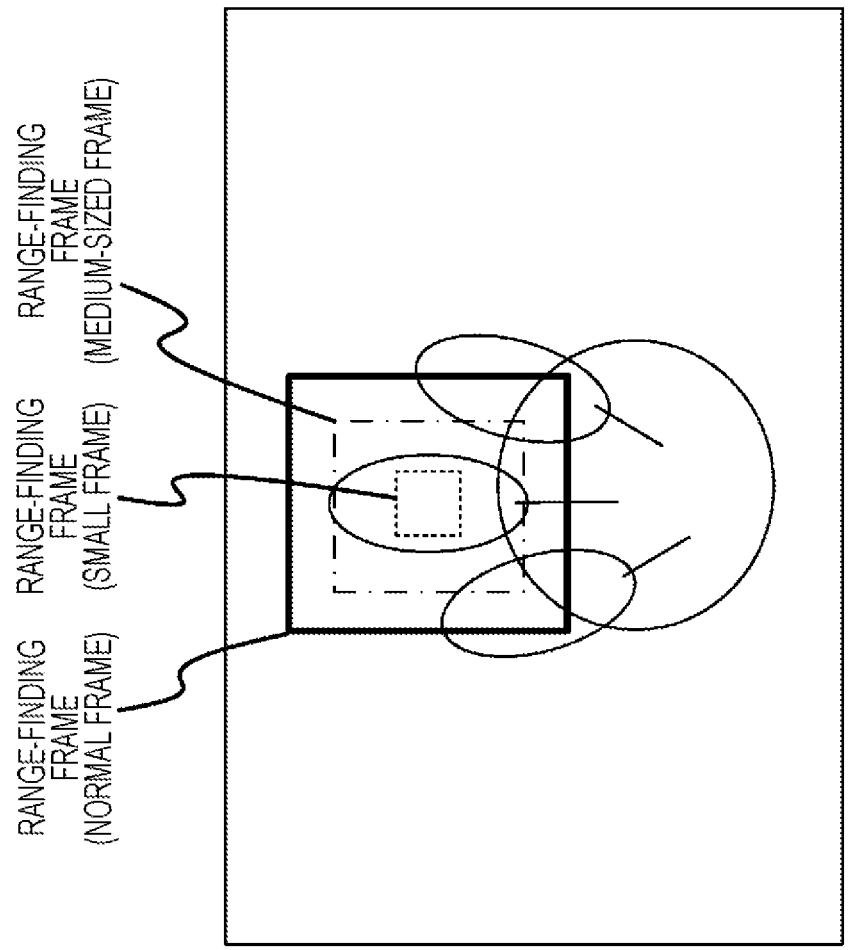
FIG. 6 is a diagram which exemplifies an arrangement of a range-finding frame which is provided in the normal frame.

For example, as illustrated in FIG. 5, when a user sets a range-finding frame, the range-finding frame arranging unit 31 provides a range-finding frame of a small sized range-finding region in a range-finding frame (hereinafter, referred to as "normal frame") which is set by a user, as illustrated in FIG. 6. In addition, in FIG. 6, a case in which two range-finding frames of small sized range-finding regions are provided by being hierarchized is exemplified, and a range-finding frame which is provided in the normal frame (frame denoted by one dot and a dashed line) is set to a "middle frame", and a range-finding frame which is provided in the middle frame (frame denoted by dotted line) is set to a "small frame".

The range-finding frame selection unit 32 selects a range-finding frame which is arranged in the range-finding frame arranging unit 31. For example, the range-finding frame selection unit 32 selects range-finding frames according to a predetermined order.

The frame display control unit 33 performs a display of a focus frame so that it is possible to determine that a subject in any of range-finding regions was performed with a focusing operation.

The element AF control unit 34 obtains the signals of the pair of phase difference AF pixels corresponding to the normal frame which is set by a user, or the range-finding region which is denoted by the range-finding frame which is selected in the range-finding frame selection unit 32 from the imaging element 211. The element AF control unit 34 generates an evaluation value which denotes focusing degree based on the obtained signal, controls a position of the focus lens based on the evaluation value, and performs the focusing operation.

Figure 7:
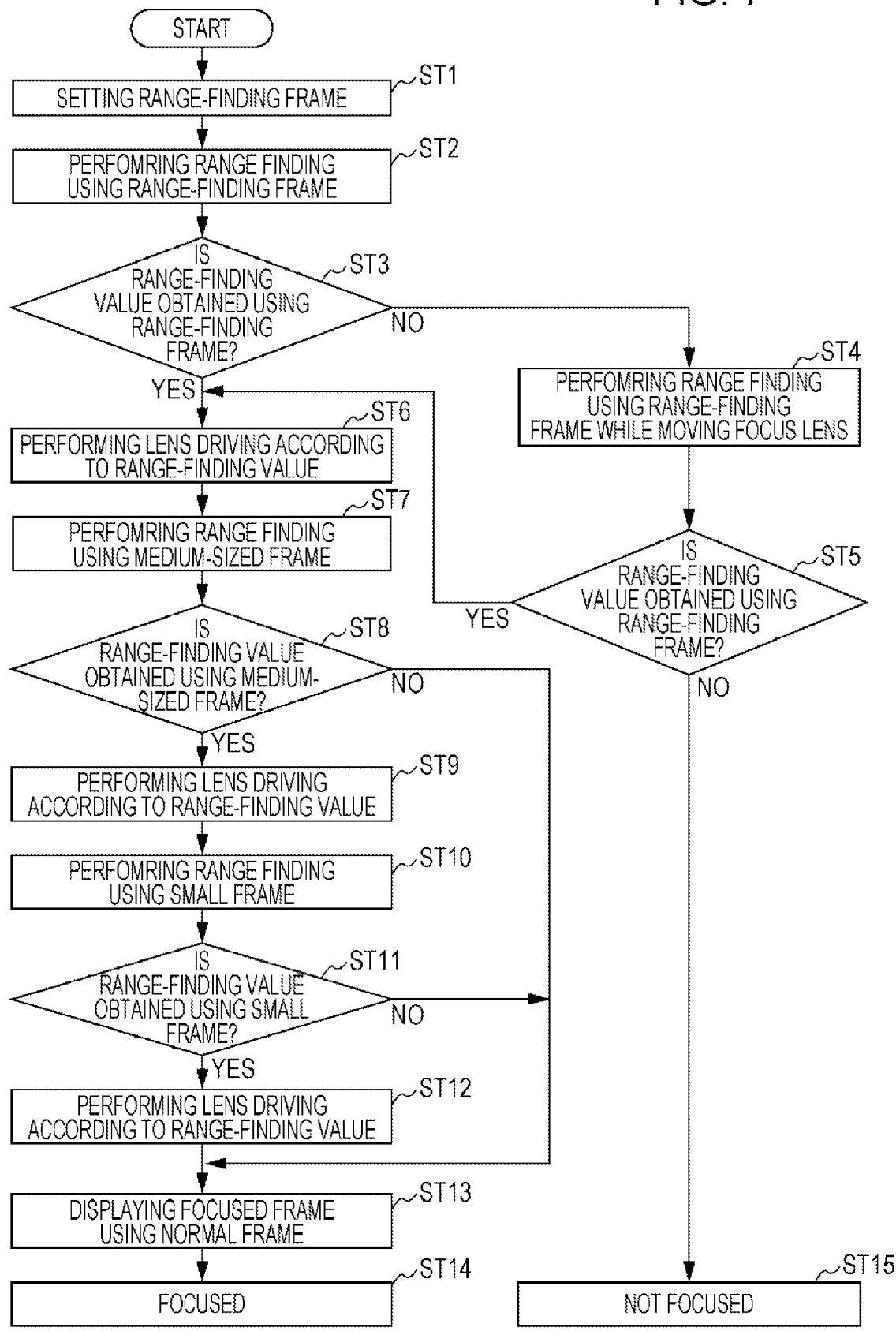
FIG. 7 is a flowchart which illustrates a first focus control operation.

1-2. Focus Control Operation of Imaging Apparatus 1-2-1. First Focus Control Operation Subsequently, a focus control operation of the imaging apparatus will be described. FIG. 7 is a flowchart which illustrates a first focus control operation. In step ST1, the camera control unit 30 performs setting of range-finding frames. The range-finding frame arranging unit 31 sets a range-finding frame (normal frame) according to a user operation based on an operation signal from the operation unit 26. In addition, the range-finding frame arranging unit 31 proceeds to step ST2 after setting a middle frame and a small frame in the normal frame.

In step ST2, the camera control unit 30 performs range finding using the normal frame. The element AF control unit 34 obtains signals of the pair of phase difference AF pixels corresponding to the range-finding region of the normal frame, generates an evaluation value denoting the degree of focusing, for example, a range-finding value, and proceeds to step ST3.

In step ST3, the camera control unit 30 determines whether or not the range-finding value is obtained using the normal frame. The camera control unit 30 proceeds to step ST6 when the range-finding value is obtained using the normal frame, and proceeds to step ST4 when the range-finding value is not obtained, for example, when it is not possible to generate the range-finding value due to a large deviation of focus.

In step ST4, the camera control unit 30 performs range finding using the normal frame while moving the focus lens. The element AF control unit 34 moves the focus lens by generating a driving signal, and outputting the signal to the lens control unit 12. In addition, the element AF control unit 34 obtains the signals of the pair of phase difference AF pixels corresponding to the range-finding region of the normal frame, generates a range-finding value, and then proceeds to step ST5.

In step ST5, the camera control unit 30 determines whether or not the range-finding value is obtained using the normal frame. The camera control unit 30 proceeds to step ST6 when the range-finding value is obtained using the normal frame, proceeds to step ST15 when the range-finding value is not obtained, and performs subsequent processing by assuming a state of non-focusing.

In step ST6, the camera control unit 30 performs lens driving according to the range-finding value. The element AF control unit 34 performs focusing operation by controlling a position of the focus lens based on the range-finding value. That is, the element AF control unit 34 moves the focus lens to a focusing position at the time of setting the range-finding region to the region of the normal frame by generating a driving signal according to the range-finding value, and outputting the signal to the lens control unit 12, and then proceeds to step ST7.

In step ST7, the camera control unit 30 performs range finding using the middle frame. The range-finding frame selection unit 32 selects the middle frame as a range-finding frame. The range-finding frame selection control unit 34 obtains signals of the pair of phase difference AF pixels corresponding to the range-finding region of the middle frame, generates a range-finding value, and then proceeds to step ST8.

In step ST8, the camera control unit 30 determines whether or not the range-finding value is obtained using the middle frame. When the range-finding value is obtained using the middle frame, the camera control unit 30 proceeds to step ST9, and proceeds to step ST13 when the range-finding value is not obtained.

In step ST9, the camera control unit 30 performs lens driving according to the range-finding value. The element AF control unit 34 performs a focusing operation by controlling a position of the focus lens based on the range-finding value. That is, the element AF control unit 34 moves the focus lens to a focusing position at the time of setting the range-finding region to the range of the middle frame, by generating a driving signal according to the range-finding value, and outputting the signal to the lens control unit 12, and then proceeds to step ST10.

In step ST10, the camera control unit 30 performs the range finding using the small frame. The range-finding frame selection unit 32 selects the small frame as a range-finding frame. The element AF control unit 34 obtains signals of the pair of phase difference AF pixels corresponding to the range-finding region of the small frame, generates a range-finding value, and then proceeds to step ST11.

In step ST11, the camera control unit 30 determines whether or not the range-finding value is obtained using the small frame. When the range-finding value is obtained using the small frame, the camera control unit 30 proceeds to step ST12, and proceeds to step ST13 when the range-finding value is not obtained.

In step ST12, the camera control unit 30 performs lens driving according to the range-finding value. The element AF control unit 34 performs a focusing operation by controlling a position of the focus lens based on the range-finding value. That is, the element AF control unit 34 moves the focus lens to a focusing position at the time of setting the range-finding region to the range of the small frame, by generating a driving signal according to the range-finding value, and outputting the signal to the lens control unit 12, and then proceeds to step ST13.

In step ST13, the camera control unit 30 performs a display of a focus frame using the normal frame. The frame display control unit 33 performs the display of focus frame denoting a focused state using the normal frame. For example, the frame display control unit switches properties of the normal frame, for example, a display color, a line type, or the like to the focusing state, and proceeds to step ST14.

In step ST14, the camera control unit 30 performs subsequent processing by assuming a state of focusing.

In this manner, in the imaging apparatus 10-1, the range finding is performed by selecting a range-finding frame in order of a range-finding frame of which the range size is large, and moves the focus lens based on a range-finding value every time the range-finding value is obtained. Accordingly, since it is possible to perform the focusing operation using a smaller range-finding frame, it is possible to improve the focusing precision compared to a case in which the range finding is performed using only the normal frame. In addition, the range-finding value is generated by obtaining the signals of the pair of phase difference AF pixels corresponding to the range-finding region of the normal frame, the focusing operation is performed based on the range-finding value, and the focus lens is moved to the focusing position at the time of setting the range-finding region to the region of the normal frame. Accordingly, it is possible to secure the same focus precision as that of an imaging apparatus in the related art in which the range finding is performed using only the normal frame, even though a range-finding value is not generated when the range finding is performed in a range-finding frame of which a region size is smaller than that of the normal frame.

1-2-2. Second Focus Control Operation

Subsequently, a focus control operation when it is possible to identify which range-finding frame became a base of lens driving which is performed based on a range-finding value obtained from range-finding frames will be described as a second focus control operation.

Figure 8:
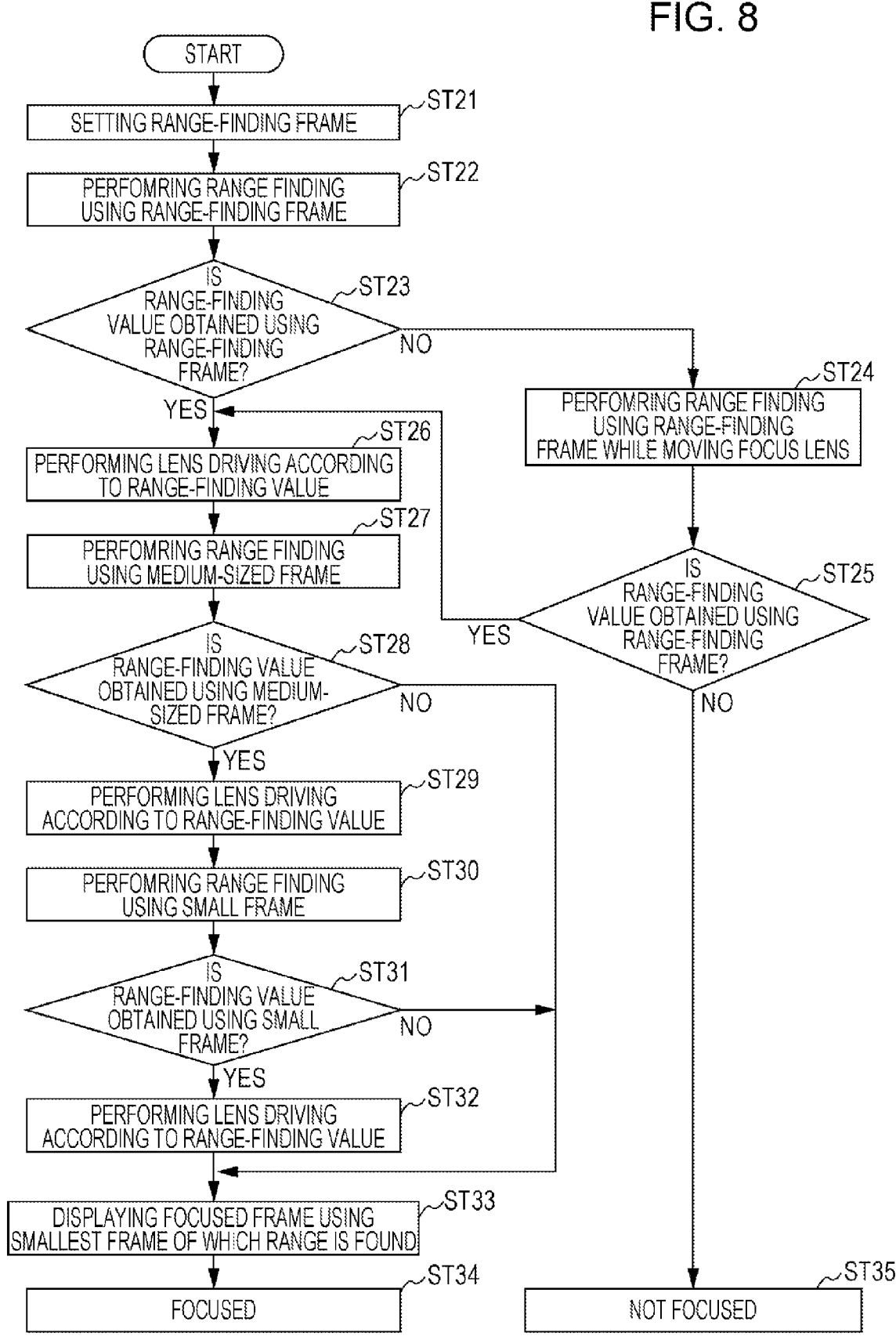
FIG. 8 is a flowchart which illustrates a second focus control operation.

FIG. 8 is a flowchart which illustrates the second focus control operation. In step ST21, the camera control unit 30 sets a range-finding frame. The range-finding frame arranging unit 31 sets a range-finding frame (normal frame) according to a user operation based on an operation signal from the operation unit 26. In addition, the range-finding frame arranging unit 31 proceeds to step ST22 after setting the middle frame and the small frame in the normal frame In step ST22, the camera control unit 30 performs the range finding using the normal frame. The element AF control unit 34 generates a range-finding value by obtaining the signals of the pair of phase difference AF pixels corresponding to the range finding of the normal frame, and proceeds to step ST23.

In step ST23, the camera control unit 30 determines whether or not the range-finding value is obtained using the normal frame. When the range-finding value is obtained using the normal frame, the camera control unit 30 proceeds to step ST26, and proceeds to step ST24 when the range-finding value is not obtained.

In step ST24, the camera control unit 30 performs range finding using the normal frame while moving the focus lens. The element AF control unit 34 moves the focus lens by generating a driving signal, and outputting the signal to the lens control unit 12. In addition, the element AF control unit 34 generates a range-finding value by obtaining signals of the pair of phase difference AF pixels corresponding to the range-finding region of the normal frame, and proceeds to step ST25.

In step ST25, the camera control unit 30 determines whether or not the range-finding value is obtained using the normal frame. When the range-finding value is obtained using the normal frame, the camera control unit 30 proceeds to step ST26, proceeds to step ST35 when the range-finding value is not obtained, and performs subsequent processing by assuming a state of non-focusing.

In step ST26, the camera control unit 30 performs lens driving according to the range-finding value. The element AF control unit 34 performs a focusing operation based on the range-finding value, and moves the focus lens to the focusing position at the time of setting the range-finding region to the region of the normal frame, and then proceeds to step ST27.

In step ST27, the camera control unit 30 performs range finding using the middle frame. The range-finding frame selection unit 32 selects the middle frame as the range-finding frame. The element AF control unit 34 generates a range-finding value by obtaining signals of the pair of phase difference AF pixels corresponding to the range-finding region of the middle frame, and proceeds to step ST28.

In step ST28, the camera control unit 30 determines whether or not the range-finding value is obtained using the middle frame. When the range-finding value is obtained using the middle frame, the camera control unit 30 proceeds to step ST29, and proceeds to step ST33 when the range-finding value is not obtained.

In step ST29, the camera control unit 30 performs lens driving according to the range-finding value. The element AF control unit 34 performs a focusing operation based on the range-finding value, and moves the focus lens to a focusing position at the time of setting the range-finding region to the region of the middle frame, and then proceeds to step ST30.

In step ST30, the camera control unit 30 performs range finding using the small frame. The range-finding frame selection unit 32 selects the small frame as the range-finding frame. The element AF control unit 34 generates a range-finding value by obtaining signals of the pair of phase difference AF pixels corresponding to the range-finding region of the small frame, and proceeds to step ST31.

In step ST31, the camera control unit 30 determines whether or not the range-finding value is obtained using the small frame. When the range-finding value is obtained using the small frame, the camera control unit 30 proceeds to step ST32, and proceeds to step ST33 when the range-finding value is not obtained.

In step ST32, the camera control unit 30 performs lens driving according to the range-finding value. The element AF control unit 34 performs a focusing operation based on the range-finding value, and moves the focus lens to a focusing position at the time of setting the range-finding region to the region of the small frame, and then proceeds to step ST33.

In step ST33, the camera control unit 30 performs a display of a focus frame using the smallest frame which can be subject to range finding. When the range-finding value is obtained using the frame display control unit 33, a display of focus frame denoting a focused state using the small frame is performed. In addition, for example, when it is possible to obtain the range-finding value using the middle frame, and it is not possible to obtain the range-finding value using the small frame, the frame display control unit 33 performs a display of focus frame denoting a focused state using the middle frame. Further, when it is possible to obtain the range-finding value using the normal frame, and it is not possible to obtain the range-finding value using the middle frame and the small frame, the frame display control unit 33 performs a display of a focus frame denoting a focused state using the normal frame. In this manner, the camera control unit 30 performs a display of focus frame according to a range finding result in each range-finding frame which is arranged in the range-finding frame arranging unit 31, and proceeds to step ST34.

In step ST34, the camera control unit 30 performs subsequent processing by assuming as a focused state.

In this manner, in the imaging apparatus 10-1, range finding is performed by selecting a range-finding frame of a large sized region in descending order, and moves the focus lens based on a range-finding value every time the range-finding value is obtained. Accordingly, since it is possible to perform a focusing operation using a smaller range-finding frame, it is possible to improve focus precision compared to a case in which range finding is performed using only the normal frame. In addition, since the display of focus frame is performed using the smallest range-finding frame of which a range-finding value is obtained, it is possible for a user to determine which range-finding region is focused on more specifically.

1-2-3. Third Focus Control Operation

Figure 9:
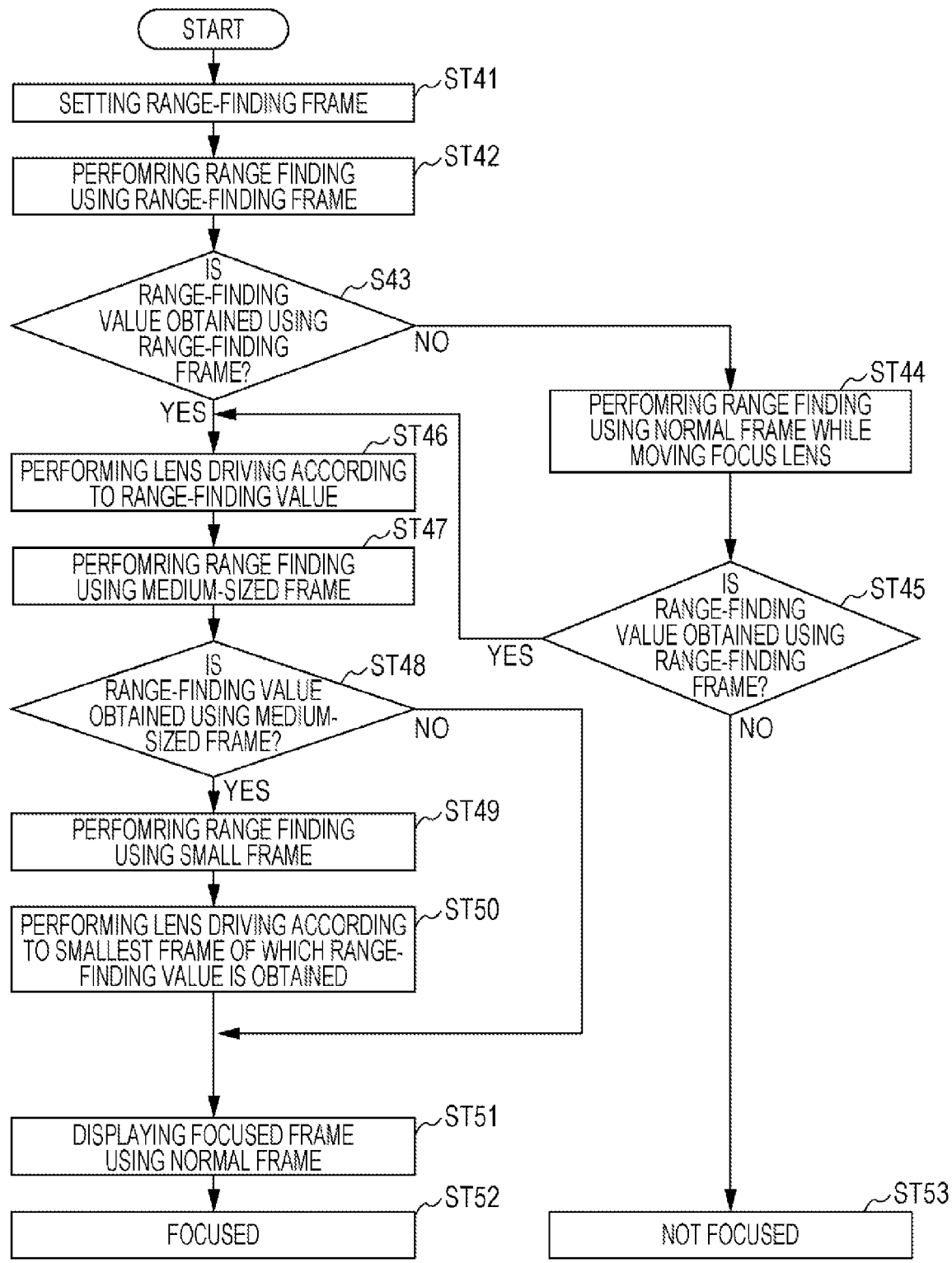
FIG. 9 is a flowchart which illustrates a third focus control operation.

Subsequently, in a third focus control operation, a case in which the number of driving of the focus lens is reduced will be described. FIG. 9 is a flowchart which illustrates the third focus control operation. In step ST41, the camera control unit 30 sets a range-finding frame. The range-finding frame arranging unit 31 sets a range-finding frame (normal frame) according to a user operation based on an operation signal from the operation unit 26. In addition, the range-finding frame arranging unit 31 proceeds to step ST42 after setting a middle frame and a small frame in the normal frame.

In step ST42, the camera control unit 30 performs range finding using the normal frame. The element AF control unit 34 generates a range-finding value by obtaining signals of the pair of phase difference AF pixels corresponding to a range-finding region of the normal frame, and proceeds to step ST43.

In step ST43, the camera control unit 30 determines whether or not the range-finding value is obtained using the normal frame. When the range-finding value is obtained using the normal frame, the camera control unit 30 proceeds to step ST46, and proceeds to step ST44 when the range-finding value is not obtained.

In step ST44, the camera control unit 30 performs range finding using the normal frame while moving the focus lens. The element AF control unit 34 moves the focus lens by generating a driving signal, and outputting the signal to the lens control unit 12. In addition, the element AF control unit 34 generates a range-finding value by obtaining signals of the pair of phase difference AF pixels corresponding to the range-finding region of the normal frame, and proceeds to step ST45.

In step ST45, the camera control unit 30 determines whether or not the range-finding value is obtained using the normal frame. The camera control unit 30 proceeds to step ST46 when the range-finding value is obtained using the normal frame, proceeds to step ST53 when the range-finding value is not obtained, and performs subsequent processing by assuming a state of non-focusing.

In step ST46, the camera control unit 30 performs lens driving according to the range-finding value. The element AF control unit 34 performs a focusing operation based on the range-finding value, and moves the focus lens to a focusing position at the time of setting the range-finding region to the region of the normal frame, and then proceeds to step ST47.

In step ST47, the camera control unit 30 performs range finding using the middle frame. The range-finding frame selection unit 32 selects the middle frame as the range-finding frame. The element AF control unit 34 generates a range-finding value by obtaining signals of the pair of phase difference AF pixels corresponding to the range-finding region of the middle frame, and proceeds to step ST48.

In step ST48, the camera control unit 30 determines whether or not the range-finding value is obtained using the middle frame. When the range-finding value is obtained using the normal frame, the camera control unit 30 proceeds to step ST49, and proceeds to step ST51 when the range-finding value is not obtained.

In step ST49, the camera control unit 30 performs range finding using the small frame. The range-finding frame selection unit 32 selects the small frame as the range-finding frame. The element AF control unit 34 generates a range-finding value by obtaining signals of the pair of phase difference AF pixels corresponding to the range-finding region of the small frame, and proceeds to step ST50.

In step ST50, the camera control unit 30 performs lens driving according to a range-finding value of the smallest frame of which a range-finding value is obtained. For example, when respective range-finding values using the middle frame and the small frame are obtained, the element AF control unit 34 performs a focusing operation based on the range-finding value which is obtained by performing range finding using the small frame, and moves the focus lens to a focusing position at the time of setting the range-finding region to the region of the small frame. In addition, when the range-finding value is obtained by range finding using the middle frame, and the range-finding value is not obtained by range finding using the small frame, for example, the element AF control unit 34 performs the focusing operation based on the range-finding value using the middle frame, and moves the focus lens to a focusing position at the time of setting the range-finding region to the region of the middle frame. The element AF control unit 34 drives the focus lens in this manner, and proceeds to step ST51.

In step ST51, the camera control unit 30 performs the display of focus frame using the normal frame. The frame display control unit 33 performs the display of focus frame denoting a focused state using the normal frame, and proceeds to step ST52.

In step ST52, the camera control unit 30 performs subsequent processing by assuming a focused state.

In this manner, in the imaging apparatus 10-1, it is possible to reduce the number of lens driving times by performing range finding using range-finding frames of which sizes of region are different, and by performing the lens driving according to the range-finding value of the smallest frame of which the range-finding value is obtained. In addition, since it is possible to perform a focusing operation using a smaller range-finding frame, the focusing precision can be improved compared to a case in which the range finding is performed using only the normal frame.

1-2-4. Fourth Focus Control Operation

In the above described third focus control operation, a case has been described in which range finding is performed by switching the range-finding frame to the small frame from the middle frame, however, it is also possible to switch to the middle frame from the small frame. In the fourth focus control operation, a case of switching to the middle frame from the small frame will be described.

Figure 10:
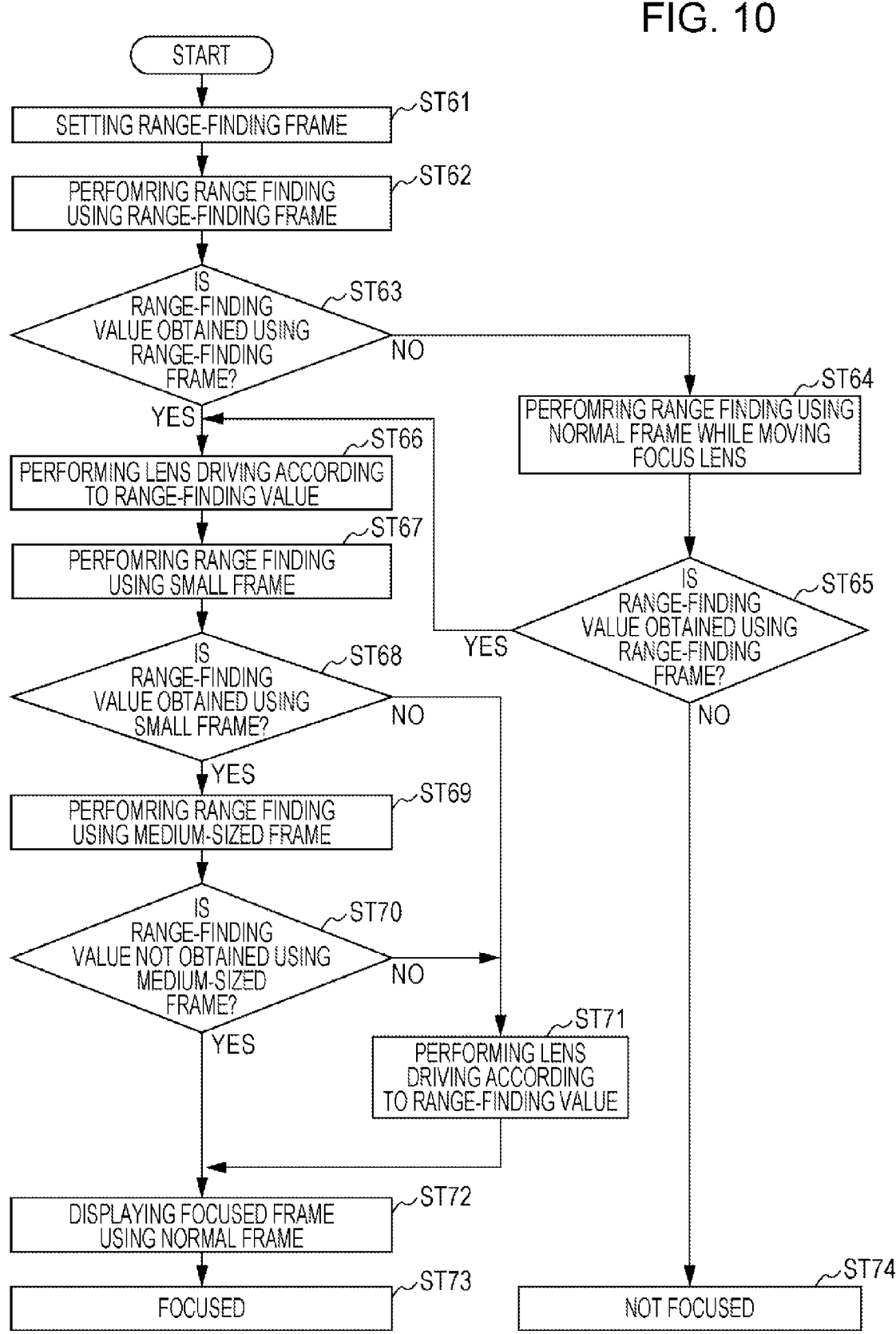
FIG. 10 is a flowchart which illustrates a fourth focus control operation.

FIG. 10 is a flowchart which illustrates the fourth focus control operation. In step ST61, the camera control unit 30 sets a range-finding frame. The range-finding frame arranging unit 31 sets a range-finding frame (normal frame) according to a user operation based on an operation signal from the operation unit 26. In addition, the range-finding frame arranging unit 31 sets the middle frame and the small frame in the normal frame, and proceeds to step ST62.

In step ST62, the camera control unit 30 performs range finding using the normal frame. The element AF control unit 34 generates a range-finding value by obtaining signals of the pair of phase difference AF pixels corresponding to a range-finding region of the normal frame, and proceeds to step ST63.

In step ST63, the camera control unit 30 determines whether or not the range-finding value is obtained using the normal frame. When the range-finding value is obtained using the normal frame, the camera control unit 30 proceeds to step ST66, and proceeds to step ST64 when the range-finding value is not obtained.

In step ST64, the camera control unit 30 performs range finding using the normal frame while moving the focus lens. The element AF control unit 34 moves the focus lens by generating a driving signal, and outputting the signal to the lens control unit 12. In addition, the element AF control unit 34 generates a range-finding value by obtaining signals of the pair of phase difference AF pixels corresponding to the range-finding region of the normal frame, and proceeds to step ST65.

In step ST65, the camera control unit 30 determines whether or not the range-finding value is obtained using the normal frame. The camera control unit 30 proceeds to step ST66 when the range-finding value is obtained using the normal frame, proceeds to step ST74 when the range-finding value is not obtained, and performs subsequent processing by assuming a state of non-focusing.

In step ST66, the camera control unit 30 performs lens driving according to the range-finding value. The element AF control unit 34 performs a focusing operation based on the range-finding value, and moves the focus lens to a focusing position at the time of setting the range-finding region to the region of the normal frame, and then proceeds to step ST67.

In step ST67, the camera control unit 30 performs range finding using the small frame. The range-finding frame selection unit 32 selects the small frame as the range-finding frame. The element AF control unit 34 generates a range-finding value by obtaining signals of the pair of phase difference AF pixels corresponding to the range-finding region of the small frame, and proceeds to step ST68.

In step ST68, the camera control unit 30 determines whether or not the range-finding value is obtained using the small frame. When the range-finding value in the small frame is not obtained, the camera control unit 30 proceeds to step ST69, and proceeds to step ST71 when the range-finding value is obtained.

In step ST69, the camera control unit 30 performs range finding using the middle frame. The range-finding frame selection unit 32 selects the middle frame as the range-finding frame. The element AF control unit 34 generates a range-finding value by obtaining signals of the pair of phase difference AF pixels corresponding to the range-finding region of the middle frame, and proceeds to step ST70.

In step ST70, the camera control unit 30 determines whether or not the range-finding value is obtained using the middle frame. When the range-finding value in the middle frame is not obtained, the camera control unit 30 proceeds to step ST72, and proceeds to step ST71 when the range-finding value is not obtained.

In step ST71, the camera control unit 30 performs lens driving according to the obtained range-finding value. When the range-finding value is obtained by performing range finding using the small frame, for example, the element AF control unit 34 performs a focusing operation based on the range-finding value, and moves the focus lens to a focusing position at the time of setting the range-finding region to the region of the small frame. In addition, when the range-finding value is obtained by range finding using the middle frame, not by range finding using the small frame, for example, the element AF control unit 34 performs the focusing operation based on the range-finding value using the middle frame, and moves the focus lens to a focusing position at the time of setting the range-finding region to the region of the middle frame. The element AF control unit 34 proceeds to step ST72 by driving the focus lens in this manner.

In step ST72, the camera control unit 30 performs a display of focus frame using the normal frame. The frame display control unit 33 performs the display of focus frame denoting a focused state using the normal frame, and proceeds to step ST73.

In step ST73, the camera control unit 30 performs subsequent processing by assuming as a focused state.

In this manner, in the imaging apparatus 10-1, even when range finding is performed by switching a size of the range-finding frame from a large range-finding frame to a small range-finding frame, it is possible to improve the focusing precision compared to a case in which the range finding is performed using only the normal frame, by moving the focus lens based on the range-finding value of the smallest frame of which the range-finding value is obtained.

1-2-5. Fifth Focus Control Operation

Figure 11:
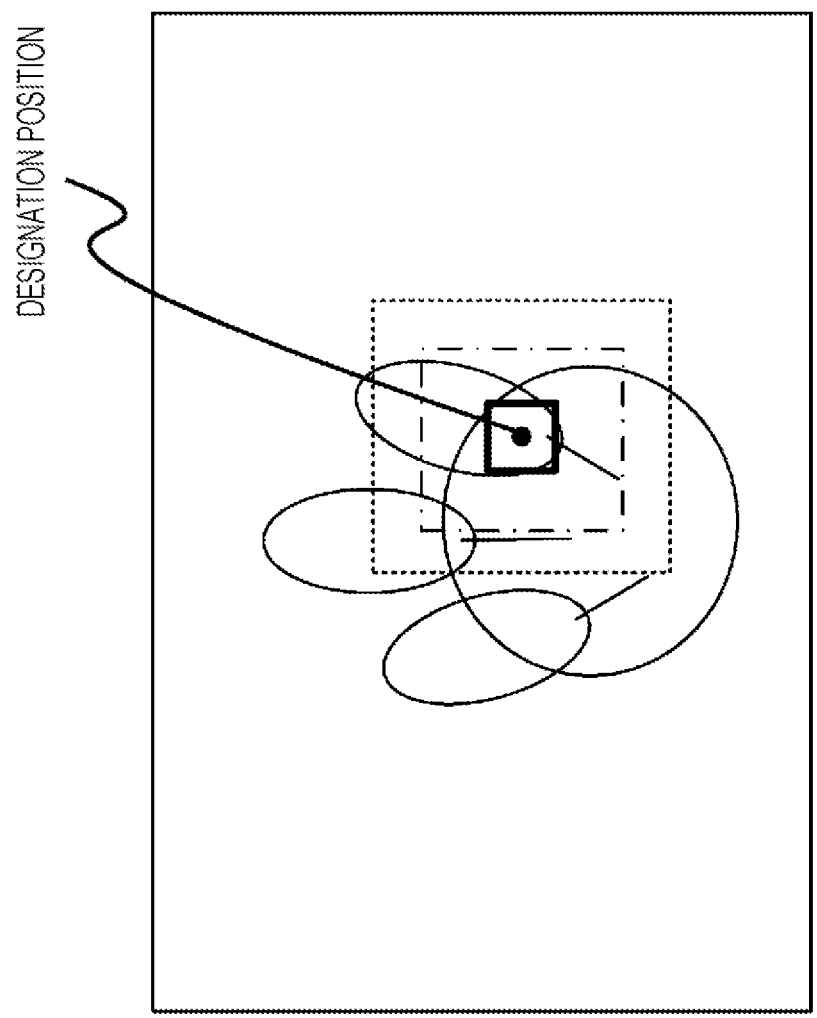
FIG. 11 is a diagram which exemplifies a range-finding frame which is arranged around a position which is designated by a user.

In addition, in the above described embodiment, a case has been described in which a user sets a normal frame at a desired position of a subject, and performs the focus control operation, however, it is also possible that a user designate a focusing position, and the imaging apparatus 10-1 arranges the range-finding frame based on the designated position. For example, a touch panel is used on a screen of a monitor unit 271 as the operation unit 26, for example, and a range-finding frame is arranged based on a touched position by a user. In addition, the range-finding frame is arranged based on a position which is designated by a cursor display or the like, by providing the cursor display or the like on the screen. As illustrated in FIG. 11, for example, when arranging the range-finding frame, the normal frame, the middle frame, and the small frame are arranged around the position which is designated by a user.

Figure 12:
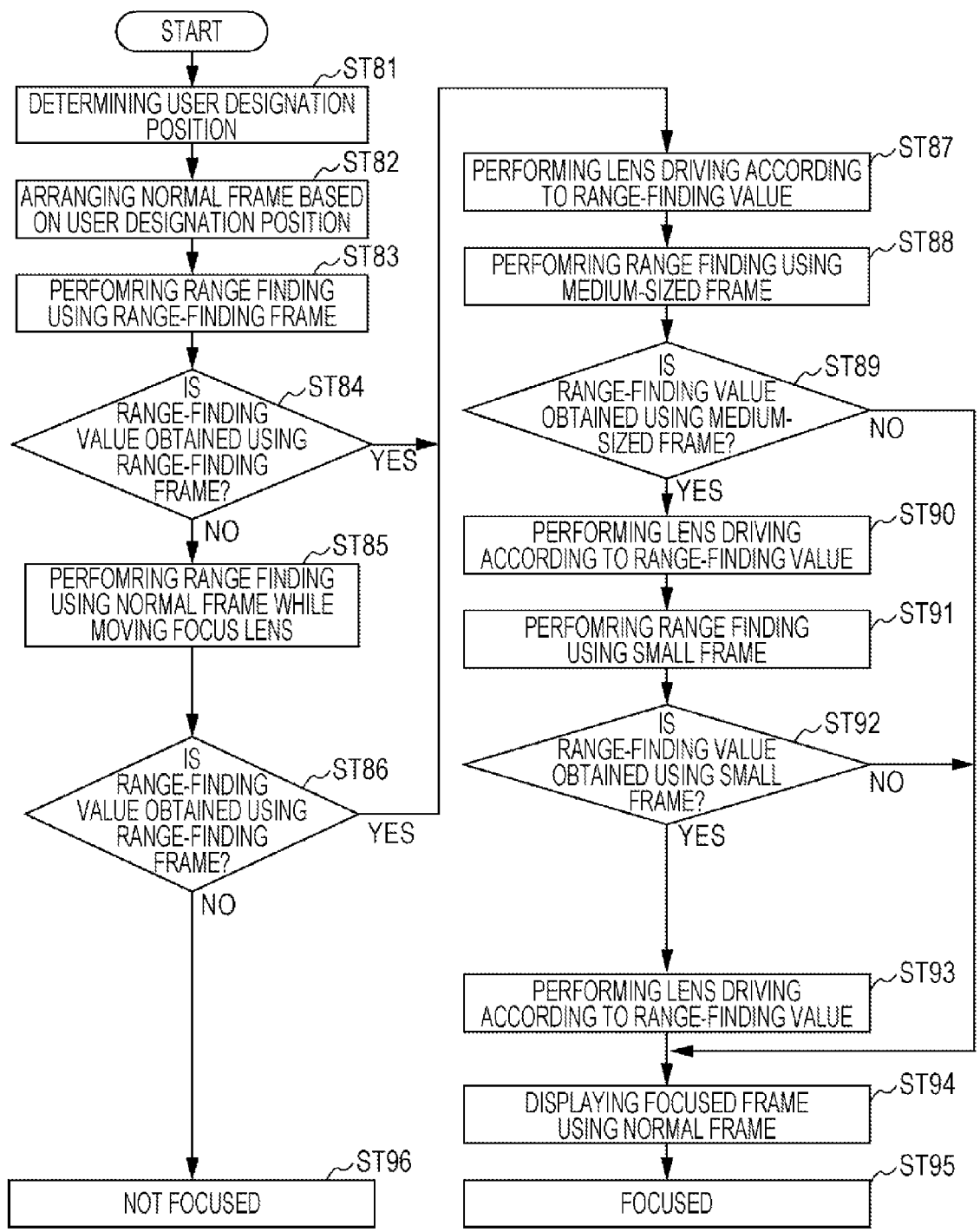
FIG. 12 is a flowchart which illustrates a fifth focus control operation.

FIG. 12 is a flowchart which illustrates a fifth focus control operation. In step ST81, the camera control unit 30 determines a designated position. The camera control unit 30 determines the position which is designated by a user based on an operation signal from the operation unit 26, and proceeds to step ST82.

In step ST82, the camera control unit 30 arranges a range-finding frame based on the position which is designated by a user. The range-finding frame arranging unit 31 sets the normal frame, the middle frame, and the small frame around the position designated by a user which is determined in step ST81, and proceeds to step ST83.

In step ST83, the camera control unit 30 performs range finding using the normal frame. The element AF control unit 34 generates a range-finding value by obtaining the pair of phase difference AF pixels corresponding to a range-finding region of the normal frame, and proceeds to step ST84.

In step ST84, the camera control unit 30 determines whether or not the range-finding value is obtained using the normal frame. When the range-finding value in the normal frame is obtained, the camera control unit 30 proceeds to step ST87, and proceeds to step ST85 when the range-finding value is not obtained.

In step ST85, the camera control unit 30 performs range finding using the normal frame while moving the focus lens. The element AF control unit 34 moves the focus lens by generating a driving signal, and outputting the signal to the lens control unit 12. In addition, the element AF control unit 34 generates a range-finding value by obtaining signals of the pair of phase difference AF pixels corresponding to the range-finding region of the normal frame, and proceeds to step ST86.

In step ST86, the camera control unit 30 determines whether or not the range-finding value is obtained using the normal frame. The camera control unit 30 proceeds to step ST87 when the range-finding value is obtained using the normal frame, proceeds to step ST96 when the range-finding value is not obtained, and performs subsequent processing by assuming as a state of non-focusing.

In step ST87, the camera control unit 30 performs lens driving according to the range-finding value. The element AF control unit 34 performs a focusing operation based on the range-finding value, and moves the focus lens to a focusing position at the time of setting the range-finding region to the region of the normal frame, and then proceeds to step ST88.

In step ST88, the camera control unit 30 performs range finding using the middle frame. The range-finding frame selection unit 32 selects the middle frame as the range-finding frame. The element AF control unit 34 generates a range-finding value by obtaining signals of the pair of phase difference AF pixels corresponding to the range-finding region of the middle frame, and proceeds to step ST89.

In step ST89, the camera control unit 30 determines whether or not the range-finding value is obtained using the middle frame. When the range-finding value in the middle frame is obtained, the camera control unit 30 proceeds to step ST90, and proceeds to step ST94 when the range-finding value is not obtained.

In step ST90, the camera control unit 30 performs lens driving according to the range-finding value. The element AF control unit 34 performs a focusing operation based on the range-finding value, and moves the focus lens to a focusing position at the time of setting the range-finding region to the region of the middle frame, and then proceeds to step ST91.

In step ST91, the camera control unit 30 performs range finding using the small frame. The range-finding frame selection unit 32 selects the small frame as the range-finding frame. The element AF control unit 34 generates a range-finding value by obtaining signals of the pair of phase difference AF pixels corresponding to the range-finding region of the small frame, and proceeds to step ST92.

In step ST92, the camera control unit 30 determines whether or not the range-finding value is obtained using the small frame. When the range-finding value is obtained using the small frame, the camera control unit 30 proceeds to step ST93, and proceeds to step ST94 when the range-finding value is not obtained.

In step ST93, the camera control unit 30 performs lens driving according to the range-finding value. The element AF control unit 34 performs a focusing operation based on the range-finding value, and moves the focus lens to a focusing position at the time of setting the range-finding region to the region of the small frame, and then proceeds to step ST94.

In step ST94, the camera control unit 30 performs a display of focus frame using the normal frame. The frame display control unit 33 performs the display of focus frame denoting a focused state using the normal frame, and proceeds to step ST95.

In step ST95, the camera control unit 30 performs subsequent processing by assuming a focused state.

In this manner, even when performing range finding based on a position which is instructed by a user, it is possible to improve the focus precision similarly to that in the first to fourth focus control operations.

In addition, in the fifth focus control operation, a case is described in which a focusing operation is performed based on a range-finding value which is generated by range finding using the middle frame, or the small frame, after performing the focusing operation using the normal frame, however, it is also possible to perform the range finding using the small frame first, for example. For example, when it is not possible to obtain the range-finding value by range finding using the small frame, the range finding is performed using the middle frame. In addition, when it is not possible to obtain the range-finding value by range finding using the middle frame, the range finding is performed using the normal frame. It is also possible to perform the focusing operation using a range-finding value which is obtained first, by selecting a range-finding frame in this manner.

1-2-6. Sixth focus control operation

Meanwhile, if a range-finding frame is small, a desired subject is out of the range-finding frame when an imaging apparatus is moved, and there is a concern that a proper focusing operation may not be performed. Therefore, in a sixth focus control operation, a case will be described in which a focus control operation is performed so as not to be affected by the movement of the imaging apparatus (for example, blur of imaging apparatus or the like). When detecting a movement of the imaging apparatus, the movement is detected based on a sensor signal by providing an acceleration sensor or the like in the imaging apparatus, for example. In addition, it is also possible to detect the movement based on a calculated global motion vector by calculating the global motion vector in the signal processing unit 23 of the imaging apparatus.

Figure 13:
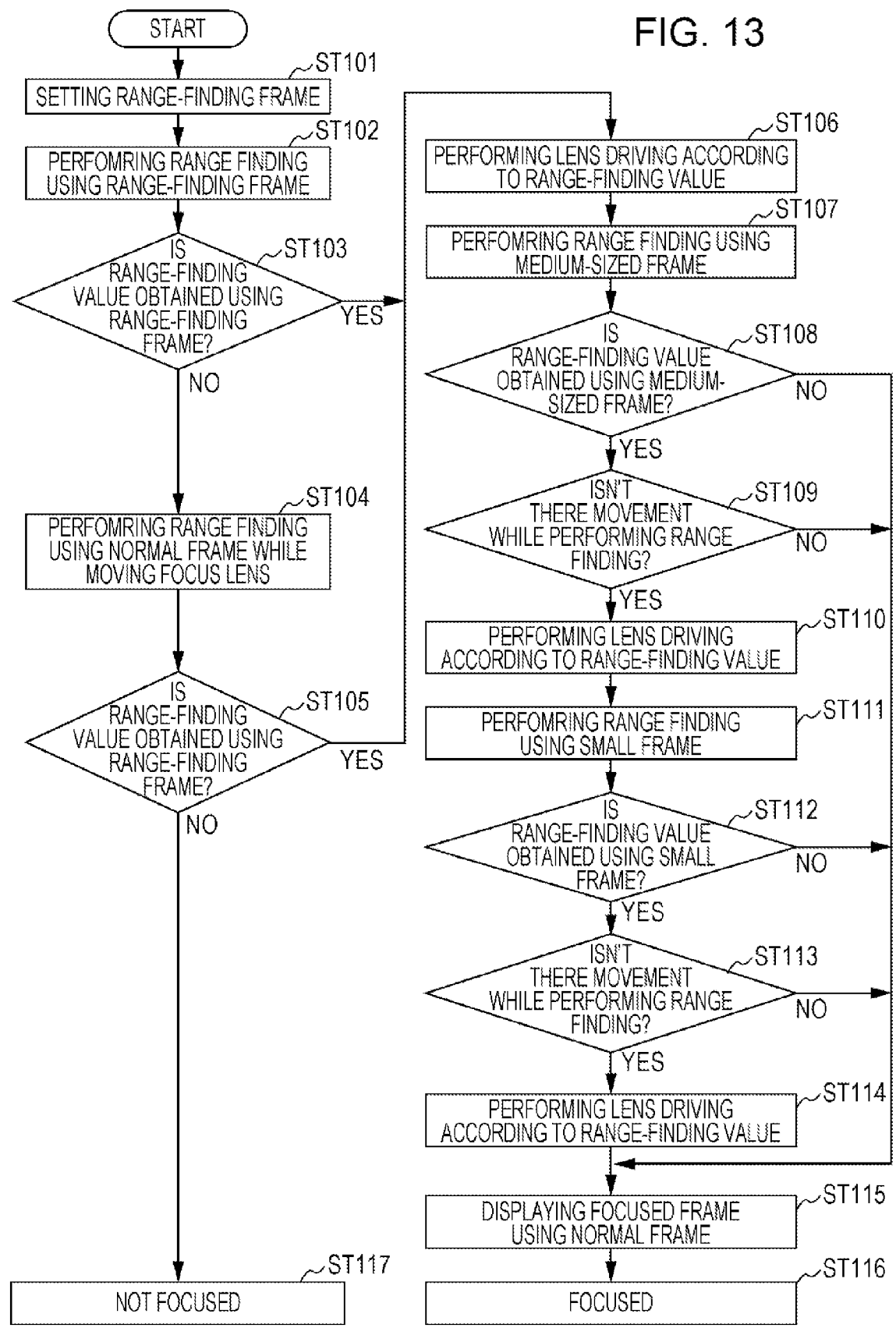
FIG. 13 is a flowchart which illustrates a sixth focus control operation.

FIG. 13 is a flowchart which illustrates the sixth focus control operation. In step ST101, the camera control unit 30 sets a range-finding frame. The range-finding frame arranging unit 31 sets a range-finding frame (normal frame) according to a user operation based on an operation signal from the operation unit 26. In addition, the range-finding frame arranging unit 31 sets the middle frame and the small frame in the normal frame, and proceeds to step ST102.

In step ST102, the camera control unit 30 performs range finding using the normal frame. The element AF control unit 34 generates a range-finding value by obtaining signals of the pair of phase difference AF pixels corresponding to the range-finding region of the normal frame, and proceeds to step ST103.

In step ST103, the camera control unit 30 determines whether or not the range-finding value is obtained using the normal frame. When the range-finding value is obtained using the normal frame, the camera control unit 30 proceeds to step ST106, and proceeds to step ST104 when the range-finding value is not obtained.

In step ST104, the camera control unit 30 performs range finding using the normal frame while moving the focus lens. The element AF control unit 34 moves the focus lens by generating a driving signal, and outputting the signal to the lens control unit 12. In addition, the element AF control unit 34 generates a range-finding value by obtaining signals of the pair of phase difference AF pixels corresponding to the range-finding region of the normal frame, and proceeds to step ST105.

In step ST105, the camera control unit 30 determines whether or not the range-finding value is obtained using the normal frame. The camera control unit 30 proceeds to step ST106 when the range-finding value is obtained using the normal frame, proceeds to step ST117 when the range-finding value is not obtained, and performs subsequent processing by assuming a state of non-focusing.

In step ST106, the camera control unit 30 performs lens driving according to the range-finding value. The element AF control unit 34 performs a focusing operation based on the range-finding value, and moves the focus lens to a focusing position at the time of setting the range-finding region to the region of the small frame, and then proceeds to step ST107.

In step ST107, the camera control unit 30 performs range finding using the middle frame. The range-finding frame selection unit 32 selects the middle frame as the range-finding frame. The element AF control unit 34 generates a range-finding value by obtaining signals of the pair of phase difference AF pixels corresponding to the range-finding region of the middle frame, and proceeds to step ST108.

In step ST108, the camera control unit 30 determines whether or not the range-finding value is obtained using the middle frame. When the range-finding value is obtained using the middle frame, the camera control unit 30 proceeds to step ST109, and proceeds to step ST115 when the range-finding value is not obtained.

In step ST109, the camera control unit 30 determines whether or not there is a movement while performing range finding. When there is a movement of the imaging apparatus 10-1 while performing range finding, the camera control unit 30 proceeds to step ST115, since there is a concern that the range-finding frame may denote a range-finding value with respect to a subject which is different from a desired subject, because the desired subject is out of the range-finding frame. For example, when an output of a sensor of an acceleration sensor which denotes a movement of the imaging apparatus, a global motion vector which is calculated in the signal processing unit, or the like, is larger than a threshold value, it is determined that there is a movement of the imaging apparatus 10-1. In addition, when there is no movement of the imaging apparatus 10-1 while performing range finding, the camera control unit 30 proceeds to step ST110.

In step ST110, the camera control unit 30 performs lens driving according to the range-finding value. The element AF control unit 34 performs a focusing operation based on the range-finding value, and moves the focus lens to a focusing position at the time of setting the range-finding region to the region of the middle frame, and then proceeds to step ST111.

In step ST111, the camera control unit 30 performs range finding using the small frame. The range-finding frame selection unit 32 selects the small frame as the range-finding frame. The element AF control unit 34 generates a range-finding value by obtaining signals of the pair of phase difference AF pixels corresponding to the range-finding region of the small frame, and proceeds to step ST112.

In step ST112, the camera control unit 30 determines whether or not the range-finding value is obtained using the small frame. When the range-finding value is obtained using the small frame, the camera control unit 30 proceeds to step ST113, and proceeds to step ST115 when the range-finding value is not obtained.

In step ST113, the camera control unit 30 determines whether or not there is a movement while performing range finding. When there is a movement of the imaging apparatus 10-1 while performing range finding, the camera control unit 30 proceeds to step ST115. In addition, the camera control unit 30 proceeds to step ST114 when there is no movement of the imaging apparatus 10-1 while performing the range finding.

In step ST114, the camera control unit 30 performs lens driving according to the range-finding value. The element AF control unit 34 performs a focusing operation based on the range-finding value, and moves the focus lens to a focusing position at the time of setting the range-finding region to the region of the small frame, and then proceeds to step ST115.

In step ST115, the camera control unit 30 performs a display of a focused frame using the normal frame. The frame display control unit 33 performs the display of the focused frame denoting a focused state using the normal frame, and proceeds to step ST116.

In step ST116, the camera control unit 30 performs subsequent processing by assuming a focused state.

In this manner, when there is a movement while performing range finding, the imaging apparatus 10-1 makes the range-finding value invalid, and does not perform focus lens driving which is based on the range-finding value obtained when there is a movement of the imaging apparatus. Accordingly, it is possible to suppress focusing on a subject which is different from a desired subject. In addition, since it is possible to perform a focusing operation using a smaller range-finding frame by performing range finding using range-finding frames with different region sizes, the focus precision can be improved compared to a case in which the range finding is performed using only the normal frame.

1-2-7. Other Focus Control Operations

Figure 14:
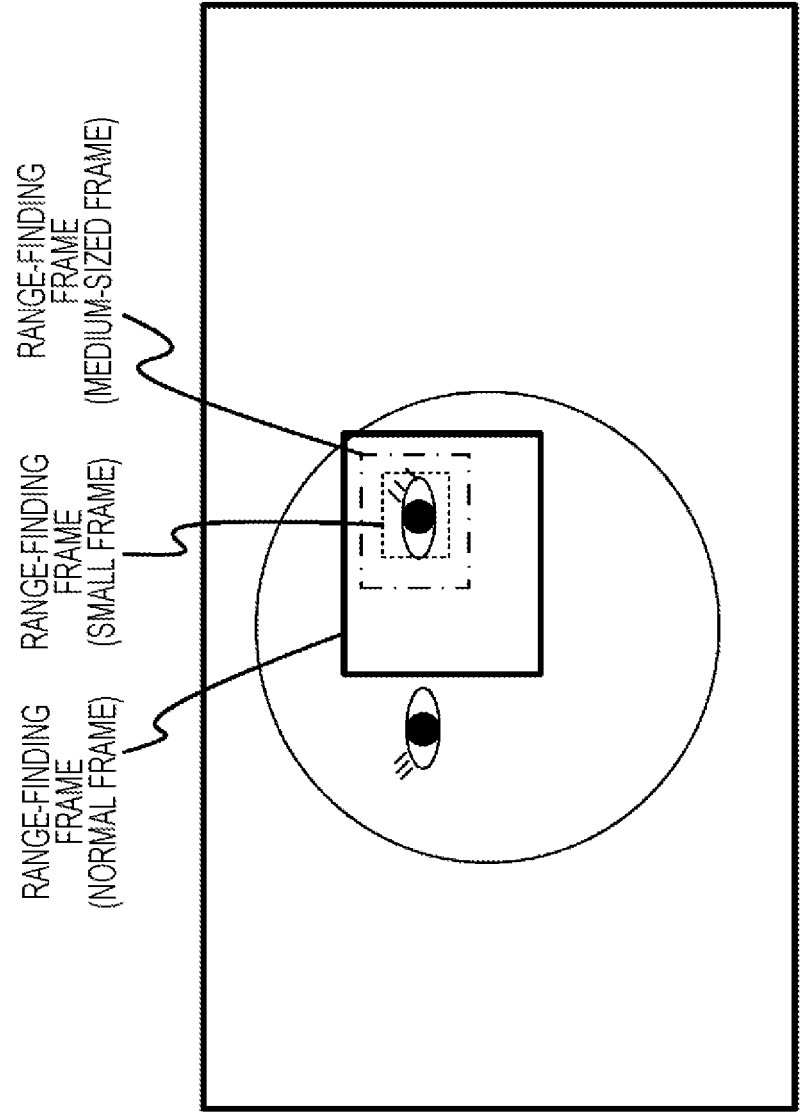
FIG. 14 is a diagram which exemplifies an arrangement of a range-finding frame using an image recognition function.

In addition, when an image recognition function is provided in the imaging apparatus 10-1, a range-finding frame may be set using an image recognition result. For example, when it is detected by an image recognition that a subject to be focused is included in a normal frame which is set by a user, range finding may be performed by setting a range-finding frame which is smaller than a normal frame according to size, location, or the like, of the subject to be focused. FIG. 14 exemplifies a case in which the range-finding frame is arranged using the image recognition result. For example, when a face recognition is performed as an image recognition, and an eye position is set to a position of a subject to be focused, if the eye is included in the normal frame, the range-finding frame is arranged around the eye position according to size, or location of the eye, and the range finding is performed as described above.

By doing so, it is possible to set the range-finding frame corresponding to the subject to be focused, and to easily focus on the desired subject with high precision.

Figure 15:
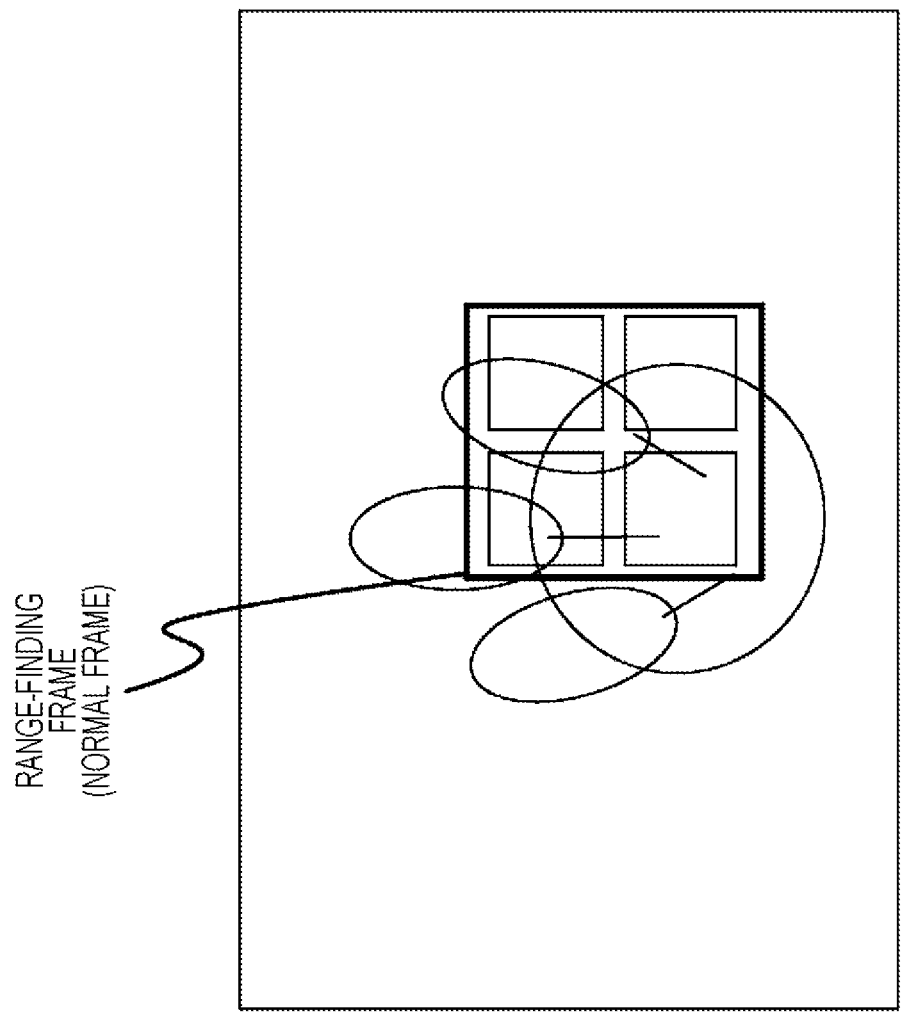
FIG. 15 is a diagram which exemplifies another arrangement of the range-finding frame.

In addition, as illustrated in FIG. 15, in the arrangement of the range-finding frame, range finding may be performed by providing a plurality of range-finding frames of a small sized region in the range-finding frame. When the plurality of range-finding frames are provided in this manner, there is a case in which a plurality of different range-finding values are obtained. Accordingly, the element AF control unit 34 may perform lens driving according to a range-finding value which is calculated using statistical processing, or a range-finding value with high priority, by performing the statistical processing, or setting of priority of the range-finding value. For example, a calculation of a mean value, a median value, or the like, is performed in the statistical processing. In addition, when setting the priority, for example, a range-finding value denoting the closest value is set to a range-finding value with the highest priority.

2. Second Embodiment

In an imaging apparatus, there is a case in which a focus detection module, for example, a phase difference AF module is also used separately from an imaging element, not only using an imaging element in which a phase difference pixel is provided. Therefore, in a second embodiment, a case will be described in which a focus control operation is performed using a signal of a focus detection pixel which is provided in the imaging element, and a signal from the focus detection module which is provided separately from the imaging element.

2-1. Configuration of Imaging Apparatus

Figure 16:
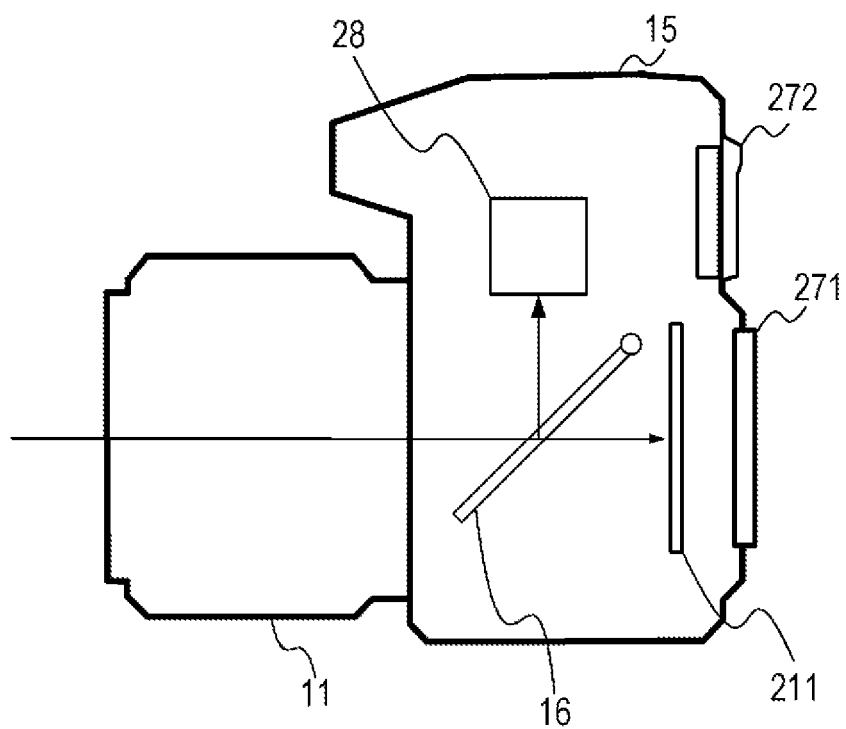
FIG. 16 is a cross-sectional schematic diagram of an imaging apparatus according to a second embodiment.

FIG. 16 illustrates a cross-sectional schematic diagram of an imaging apparatus according to the second embodiment. An imaging apparatus 10-2 includes a camera body 15, and an interchangeable lens 11 which is detachable from the camera body 15.

The interchangeable lens 11 functions as a photographing optical system for guiding object light to an imaging element 211 which is arranged in the camera body 15. The interchangeable lens 11 is provided with a lens unit which is configured by a focus lens for adjusting a focus, a zoom lens for performing variable magnification, or the like, a diaphragm for adjusting a light amount, or the like.

A semitransparent curtain (half mirror) 16, an imaging element 211, a phase difference AF module 28, and the like are provided in the camera body 15.

The semitransparent curtain 16 causes part of object light which has passed through the interchangeable lens 11 to be input to the imaging element 211 by transmitting thereof, and outputs light other than that to the phase difference AF module 28 by reflecting the light.

In the imaging element 211, for example, a plurality of pixels which are configured by including a photodiode are two-dimensionally arranged in matrix, and a CMOS image sensor (Complementary Metal Oxide Semiconductor Image Sensor) in which a color filter is arranged in a light receiving surface of each pixel is used. In addition, focus detection pixels, for example, a plurality of pair of phase difference AF pixels are provided in the imaging element.

The phase difference AF module 28 is provided with the pair of phase difference AF pixels for performing a focus detection with respect to range-finding frames which are arranged by being fixed onto a screen in advance, and it is configured such that range-finding values of each of range-finding frames are generated by signals which are output from the phase difference AF module 28. In addition, the phase difference AF module 28 is able to perform the focus detection without causing the imaging unit 21 to operate since it is possible to receive reflected light from a semitransparent curtain 16 when performing imaging or the like.

A display unit 27 is provided at the rear surface of the camera body 15. As the display unit 27, a monitor unit 271, or a viewfinder 272 is provided. The display unit 27 is configured using a liquid crystal display element, or EL (Electro Luminescence) display element, or the like. The display unit 27 performs a display of an image which is imaged using the imaging apparatus 10-1, a reproducing display of a recorded image, or the like, and displays functions which are mounted on the imaging apparatus 10-1, a mode setting screen, or the like. In addition, the display unit 27 performs a preview display or the like before performing main photographing.

Figure 17:
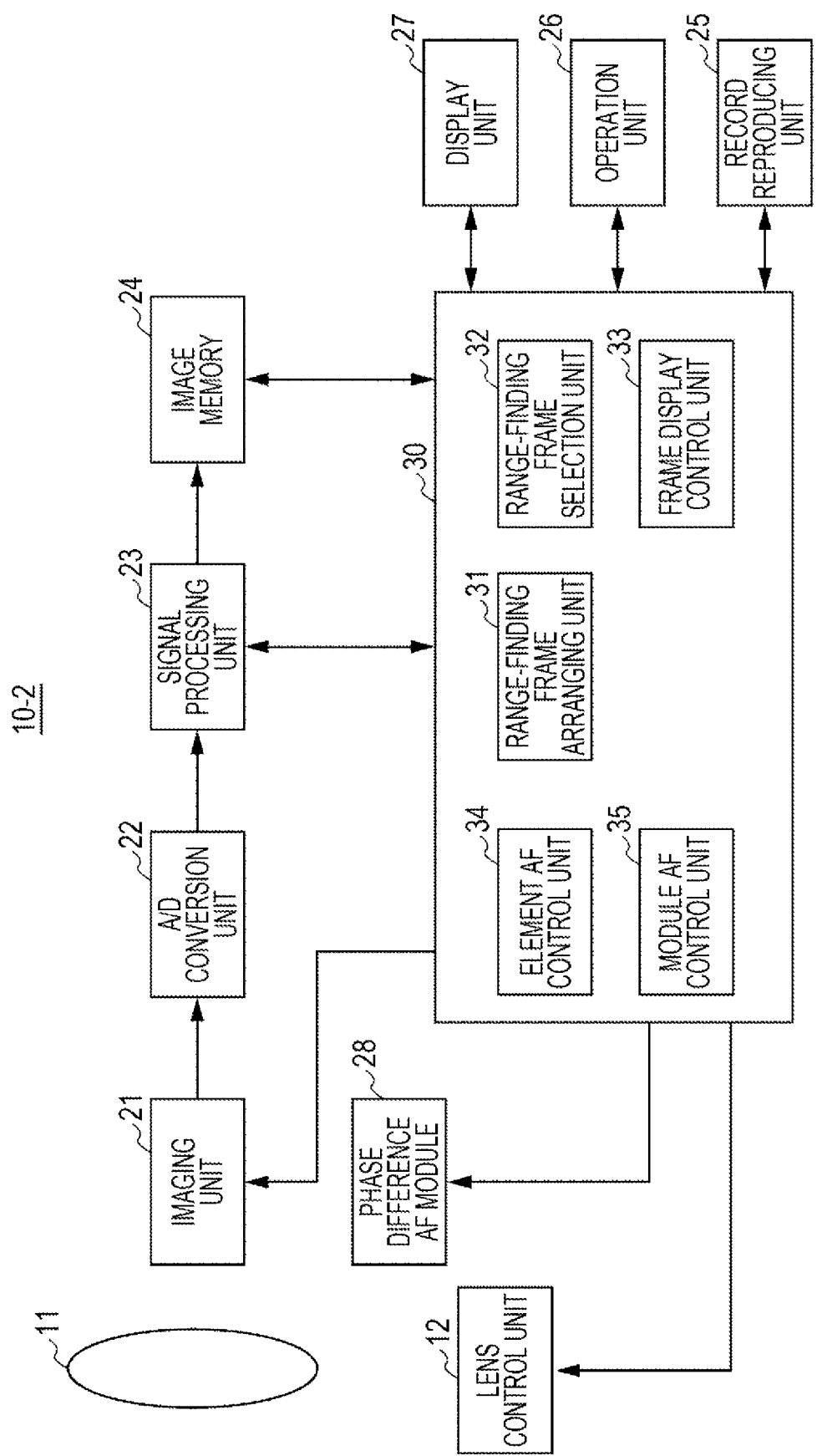
FIG. 17 is a block diagram which illustrates an electrical configuration of the imaging apparatus according to the second embodiment.

FIG. 17 is a block diagram which illustrates an electrical configuration of an imaging apparatus. The interchangeable lens 11 is provided with a lens control unit 12. In addition, the camera body 15 is provided with an imaging unit 21, an A/D conversion unit 22, a signal processing unit 23, an image memory 24, a record reproducing unit 25, the operation unit 26, the display unit 27, the phase difference AF module 28, and a camera control unit 30.

The lens control unit 12 of the interchangeable lens 11 performs communication with the camera control unit 30 of the camera body 15, and transmits an information signal denoting, for example, a focus distance, a lens position, or the like of the interchangeable lens 11 to the camera control unit 30. In addition, the lens control unit 12 moves the focus lens by receiving, for example, a driving signal of a focus lens from the camera control unit 30, and driving the focus lens based on the received driving signal.

The imaging unit 21 of the camera body 15 includes the above described imaging element 211, and an element driving unit (not shown) which drives the imaging element 211. The imaging element 211 is formed by the CMOS image sensor, or the like, as described above, and is performed with an operation control such as an exposing operation of the imaging element 211, reading out of a signal of each pixel in the imaging element 211, or the like, by the element driving unit. The element driving unit generates a predetermined timing signal or the like based on a reference clock which is output from the camera control unit 30, outputs the signal to the imaging element 211, and controls an operation of the imaging element 211. In addition, the imaging unit 21 performs predetermined analog signal processing with respect to an analog image signal which is output from the imaging element 211, for example, noise removing processing, gain adjusting, or the like, and outputs the image signal after the analog signal processing to the A/D conversion unit 22.

The A/D conversion unit 22 outputs the analog image signal which is supplied from the imaging unit 21 to the signal processing unit 23 by converting the signal to a digital image signal.

The signal processing unit 23 performs various camera signal processing with respect to the image signal which is supplied from the A/D conversion unit 22. For example, the signal processing unit 23 performs processing such as black level correction, white balance adjusting, gamma correction, or the like, and outputs the processed image signal to an image memory 24.

The image memory 24 is a memory which temporarily stores image data which is output from the signal processing unit 23 when it is an imaging mode, and is used as a work area for performing predetermined processing with respect to the image data using the camera control unit 30. In addition, when it is a reproducing mode, the image data which is read out from a record reproducing unit 25 is temporarily stored.

The record reproducing unit 25 records an image signal to a recording medium, for example, a detachable memory card or the like. In addition, the record reproducing unit 25 reads out the image signal which is recorded in the recording medium.

The operation unit 26 includes a shutter button, various operation switches, and the like, generates an operation signal corresponding to a user operation, and outputs the operation signal to the camera control unit 30.

The display unit 27 is configured using a liquid crystal display element, or an EL (Electro Luminescence) display element, or the like, and performs displays of an imaged image and a recorded image, a display of a live view (preview), displays of functions, set screens of modes, or the like.

Figure 18:
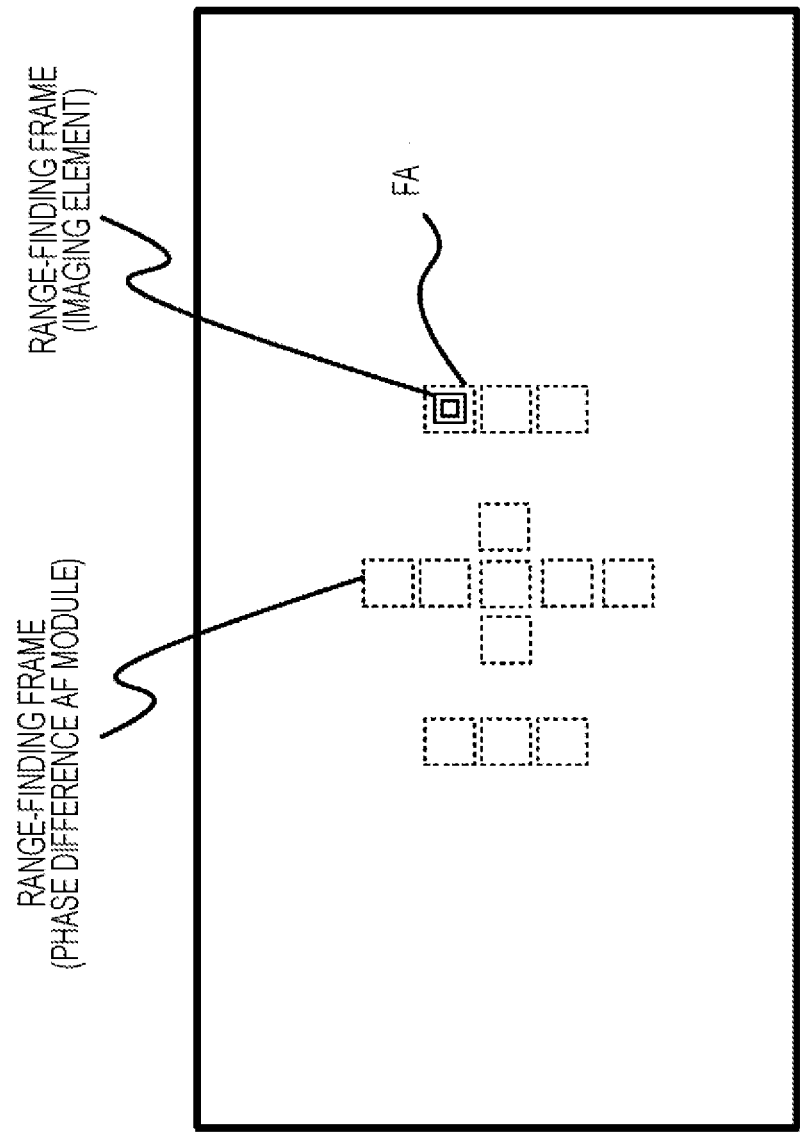
FIG. 18 is a diagram which describes a relationship between a range-finding frame of a phase difference AF module and a range-finding frame of an imaging element.

As described above, the phase difference AF module 28 is provided with the pair of phase difference AF pixels for performing the focus detection with respect to the range-finding frames which are arranged on the screed by being fixed in advance. FIG. 18 illustrates a relationship between the range-finding frames in the phase difference AF module 28 (denoted by dotted lines) and the range-finding frames of the imaging element (denoted by solid lines). The phase difference AF module 28 outputs signals which are generated in the pair of phase difference AF pixels which are provided corresponding to the range-finding frames to the camera control unit 30.

The camera control unit 30 is configured using a CPU (Central Processing Unit), a ROM (Read Only Memory) which stores a control program or the like, a RAM (Random Access Memory) which temporarily stores data, or the like. The CPU executes a control program which is stored in the ROM, and controls each unit so that the operation of the imaging apparatus 10-2 becomes an operation corresponding to the user operation.

In addition, the camera control unit 30 performs a focus control using signals from the pair of phase difference AF pixels which are provided in the imaging element, and a signal from the phase difference AF module 28.

In order to perform the focusing control, the camera control unit 30 includes, for example, a range-finding frame arranging unit 31, a range-finding frame selection unit 32, a frame display control unit 33, an element AF control unit 34, and a module AF control unit 35. In addition, the element AF control unit 34 and the module AF control unit 35 correspond to the control unit in claims.

The range-finding frame arranging unit 31 arranges a range-finding frame denoting a range-finding region according to a user operation. In addition, the range-finding frame arranging unit 31 arranges the range-finding frames of which the range-finding regions are different by hierarchizing thereof. For example, the range-finding frames are arranged by being hierarchized by providing one or a plurality of range-finding frames of which region size is small in the range-finding frame which is selected according to the user operation in the phase difference AF module 28.

The range-finding frame selection unit 32 selects a range-finding frame which is arranged in the range-finding frame arranging unit 31. For example, the range-finding frame selection unit 32 selects range-finding frames according to a predetermined order.

The frame display control unit 33 performs a display of a focus frame so that it is possible to determine that a subject in any of range-finding regions was performed with a focusing operation.

The element AF control unit 34 obtains the signals of the pair of phase difference AF pixels corresponding to the range-finding region which is denoted in the range-finding frame which is selected in the range-finding frame selection unit 32 from the imaging element 211, generates an evaluation value denoting degree of focusing, controls a position of the focus lens based on the evaluation value, and performs a focusing operation.

The module AF control unit 35 obtains the signals of the pair of phase difference AF pixels corresponding to the range-finding frame which is selected by a user from the range-finding frames which are set in advance in the phase difference AF module 28 from the phase difference AF module 28. In addition, the module AF control unit 35 generates an evaluation value denoting degree of focusing based on the obtained signal, and performs a focusing operation by controlling a position of the focus lens based on the evaluation value.

2-2. Focus Control Operation of Imaging Apparatus

Figure 19:
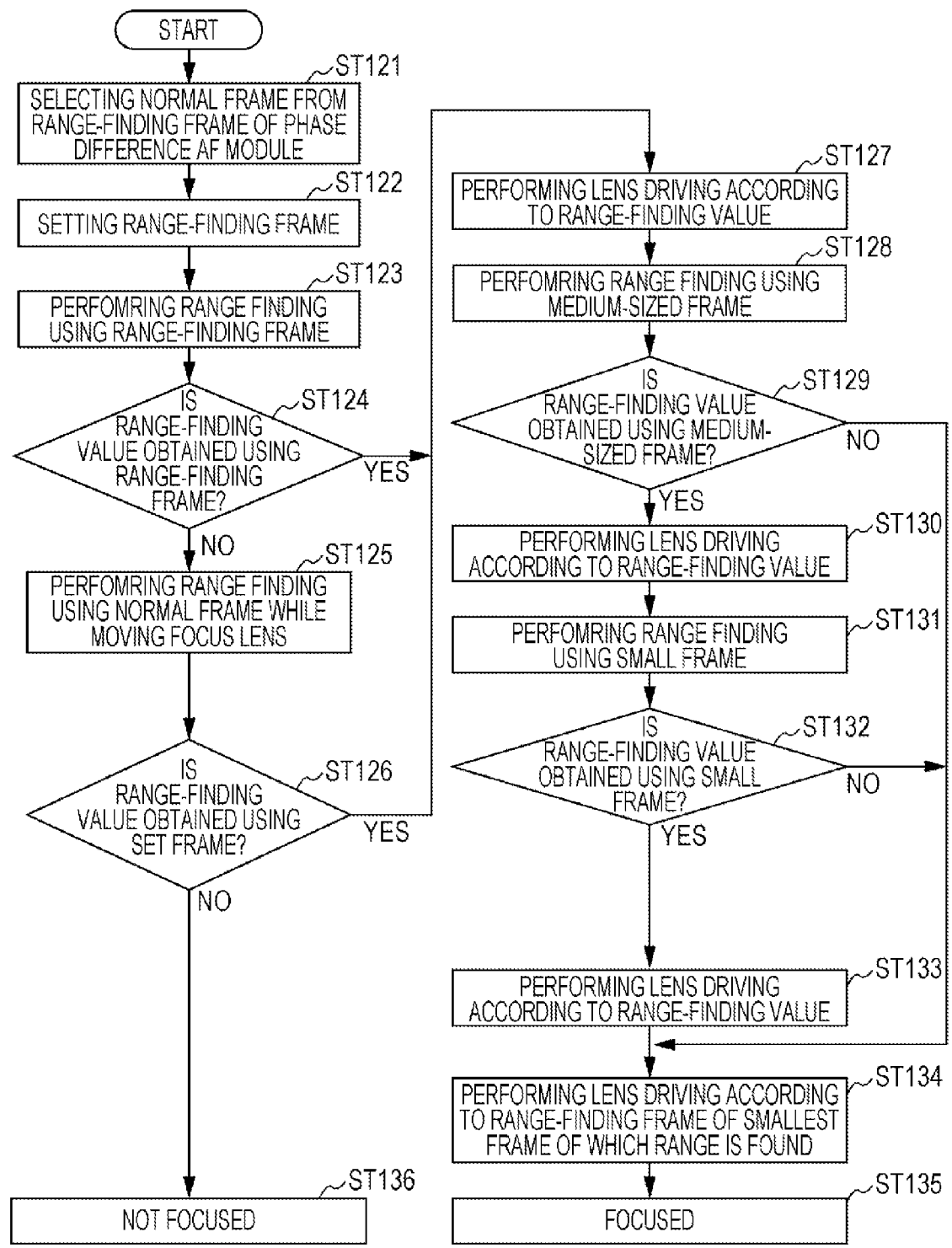
FIG. 19 is a flowchart which illustrates a focus control operation of the imaging apparatus according to the second embodiment.

Subsequently, the focusing operation of the imaging apparatus will be described. FIG. 19 is a flowchart which illustrates a focus control operation of the imaging apparatus according to the second embodiment. In step ST121, the camera control unit 30 selects a normal frame from the range-finding frame of the phase difference AF module. The range-finding frame arranging unit 31 sets the frame which is selected by a user from the range-finding frame of the phase difference AF module 28 as the normal frame based on the operation signal from the operation unit 26, and proceeds to step ST122.

In step ST122, the camera control unit 30 sets a range-finding frame. The range-finding frame arranging unit 31 sets the middle frame and small frame in the normal frame which is selected in step ST121, and proceeds to step ST123. For example, in FIG. 18, when the range-finding frame AF in the phase difference AF module is selected as the normal frame, the middle frame and small frame are set in the normal frame as denoted by solid lines.

In step ST123, the camera control unit 30 performs range finding using the normal frame. The module AF control unit 35 generates a range-finding value by obtaining signals of the pair of phase difference AF pixels corresponding to the range-finding region of the normal frame from the phase difference AF module 28, and proceeds to step ST124.

In step ST124, the camera control unit 30 determines whether or not the range-finding value is obtained using the normal frame. When the range-finding value is obtained using the normal frame, the camera control unit 30 proceeds to step ST127, and proceeds to step ST125 when the range-finding value is not obtained.

In step ST125, the camera control unit 30 performs range finding using the normal frame while moving the focus lens. The module AF control unit 35 moves the focus lens by generating a driving signal, and outputting the signal to the lens control unit 12. In addition, the module AF control unit 35 generates the range-finding value by obtaining signals of the pair of phase difference AF pixels corresponding to the range-finding region of the normal frame, and proceeds to step ST126.

In step ST126, the camera control unit 30 determines whether or not the range-finding value is obtained using the normal frame. The camera control unit 30 proceeds to step ST127 when the range-finding value is obtained using the normal frame, proceeds to step ST136 when the range-finding value is not obtained, and performs subsequent processing by assuming a non-focusing state.

In step ST127, the camera control unit 30 performs lens driving according to the range-finding value. The module AF control unit 35 performs a focusing operation based on the range-finding value, and moves the focus lens to a focusing position at the time of setting the range-finding region to the region of the normal frame, and then proceeds to step ST128.

In step ST128, the camera control unit 30 performs range finding using the middle frame. The range-finding frame selection unit 32 selects the middle frame as the range-finding frame. The element AF control unit 34 generates a range-finding value by obtaining signals of the pair of phase difference AF pixels corresponding to the range-finding region of the middle frame, and proceeds to step ST129.

In step ST129, the camera control unit 30 determines whether or not the range-finding value is obtained using the middle frame. When the range-finding value in the middle frame is obtained, the camera control unit 30 proceeds to step ST130, and proceeds to step ST134 when the range-finding value is not obtained.

In step ST130, the camera control unit 30 performs lens driving according to the range-finding value. The element AF control unit 34 performs a focusing operation based on the range-finding value, and moves the focus lens to a focusing position at the time of setting the range-finding region to the region of the middle frame, and then proceeds to step ST131.

In step ST131, the camera control unit 30 performs range finding using the small frame. The range-finding frame selection unit 32 selects the small frame as the range-finding frame. The element AF control unit 34 generates a range-finding value by obtaining signals of the pair of phase difference AF pixels corresponding to the range-finding region of the small frame, and proceeds to step ST132.

In step ST132, the camera control unit 30 determines whether or not the range-finding value is obtained using the small frame. When the range-finding value is obtained using the small frame, the camera control unit 30 proceeds to step ST133, and proceeds to step ST134 when the range-finding value is not obtained.

In step ST133, the camera control unit 30 performs lens driving according to the range-finding value. The element AF control unit 34 performs a focusing operation based on the range-finding value, and moves the focus lens to a focusing position at the time of setting the range-finding region to the region of the small frame, and then proceeds to step ST134.

In step ST134, the camera control unit 30 performs a display of focus frame using the normal frame. The frame display control unit 33 performs the display of focus frame denoting a focused state using the normal frame, and proceeds to step ST135.

In step ST135, the camera control unit 30 performs subsequent processing by assuming a focused state.

When the phase difference AF module 28 is provided in this manner, if a range-finding frame is selected from the range-finding frames of the phase difference AF module, the middle frame and small frame are arranged in the selected range-finding frame, and the range-finding value is generated by obtaining the signals of the pair of phase difference AF pixels which are provided in the imaging apparatus. In addition, a focusing operation is performed based on the range-finding value of the smallest frame of which the range-finding value is obtained. Accordingly, it is possible to improve the focusing precision compared to a case in which the range finding is performed using only the phase difference AF module. In addition, a focusing operation is performed based on the range-finding value which is generated by performing the range finding using the range-finding frame of the phase difference AF module, and the focus lens is moved to a focusing position at the time of setting the range-finding region to a region of the normal frame. Accordingly, it is possible to secure the same focusing precision as that in a case in which only the phase difference AF module 28 is used, even though a range-finding value is not generated when the range finding is performed using a range-finding frame of which a size of region is smaller than that of the normal frame.

A series of processes which is described in the specification may be executed by software, hardware, or a combination of both. When executing the processes by software, a program in which a processing sequence is recorded is executed by being installed in a memory in a computer which is embedded in dedicated hardware. Alternatively, it is possible to execute the program by installing thereof in a general-purpose computer which is able to execute various processes.

For example, the program can be recorded in advance on a hard disk, or ROM (Read Only Memory) as a recording medium. Alternatively, the program can be stored (recorded) temporarily, or permanently on a removable recording medium such as a flexible disk, a CD-ROM (Compact Disc Read Only Memory), a MO (Magneto optical) disk, a DVD (Digital Versatile Disc), a magnetic disk, and a semiconductor memory card. Such a removable recording medium can be provided as so-called package software.

In addition, the program can also be transmitted to a computer in wirelessly, or by wire through a network such as a LAN (Local Area Network), or the Internet from a download site, in addition to installing to a computer from a removable recording medium. The computer is able to receive the program which is transmitted in such a manner, and to install the program on a recording medium such as an embedded hard disk.

In addition, the present technology is not interpreted by being limited to the above described embodiments. The embodiments disclose the present technology in forms of examples, and for example, the number of hierarchies or a shape of the range-finding frame, the number of frames, the range-finding frame of the phase difference AF module, or the like is not limited to the above described embodiments. That is, it is a matter of course that those skilled in the art may perform modifications, or substitutions of the embodiments without departing from the scope of the present technology, and the claims should be referred to in order to determine the scope of the present technology.

In addition, the imaging apparatus in the present technology can also be configured as follows.

(1) An imaging apparatus which includes a range-finding region arrangement unit which arranges range-finding regions of which region sizes are different by hierarchizing thereof; a range-finding region selection unit which selects the range-finding region in a predetermined order from the arranged range-finding regions; and a control unit which performs a focusing operation by generating an evaluation value which denotes degree of focusing with respect to the range-finding regions which are selected in the range-finding region selection unit, and controlling a position of a focus lens based on the evaluation value.

(2) The imaging apparatus which is disclosed in (1), in which the range-finding region selection unit selects a range-finding region of the largest sized region first, from the arranged range-finding regions, and then selects range-finding regions of other region sizes, and the control unit controls a position of the focus lens based on an evaluation value which is generated with respect to the range-finding region which is selected first, and controls the position of the focus lens based on the evaluation value which is generated in each range-finding region which is selected in the range-finding region selection unit thereafter.

(3) The imaging apparatus which is disclosed in (2), in which the range-finding region selection unit selects the range-finding region in order of the largest sized region as the predetermined order, and the control unit controls a position of the focus lens by generating an evaluation value every time a range-finding region is selected in the range-finding region selection unit.

(4) The imaging apparatus which is disclosed in (2), in which the control unit generates an evaluation value in each range-finding region which is selected in the range-finding region selection unit, and controls a position of the focus lens based on an evaluation value in a range-finding region of the smallest sized region in the generated evaluation value.

(5) The imaging apparatus which is disclosed in any one of (1) to (4), further includes an operation unit which receives an operation from a user, in which the range-finding region arrangement unit arranges the range-finding region based on a position which is instructed by the user.

(6) The imaging apparatus which is disclosed in any one of (1) to (4), further includes an operation unit which receives an operation from a user, in which the range-finding region arrangement unit causes the user to set the range-finding region to the largest sized region.

(7) The imaging apparatus which is disclosed in any one of (1) to (6), in which the control unit generates the evaluation value using a signal of a focus detection pixel which is provided in an imaging element.

(8) The imaging apparatus which is disclosed in (7), further includes a focus detection module, in which the range-finding region arrangement unit arranges range-finding regions of which the region sizes are different by setting a range-finding region of the focus detection module to a range-finding region of the largest sized region, and the control unit generates the evaluation value using a detection signal which is generated in the focus detection module when the range-finding region of the largest sized region is selected in the range-finding region selection unit.

(9) The imaging apparatus which is disclosed in any one of (1) to (8), in which the range-finding region arrangement unit arranges range-finding regions of which region sizes are different based on an image recognition result with respect to an image of a range-finding region of the largest sized region.

(10) The imaging apparatus which is disclosed in any one of (1) to (9), further includes a display unit which performs an image display, and a region display control unit which displays the range-finding region on an image which is displayed on the display unit, in which the region display control unit displays a range-finding region of the largest sized region, or a range-finding region of the smallest sized region in the generated evaluation value.

(11) The imaging apparatus which is disclosed in any one of (1) to (10), in which, when a movement of the imaging apparatus is detected while measuring a distance in a range-finding region which is selected in the range-finding region selection unit, the control unit makes an evaluation value which is generated in the selected range-finding region invalid.

The present disclosure contains subject matter related to that disclosed in Japanese Priority Patent Application JP 2012-087172 filed in the Japan Patent Office on Apr. 6, 2012, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging apparatus comprising:
    an imaging element configured to generate an image signal;
    a control unit configured to process the image signal, wherein the control unit comprises one or more central processing units (CPUs) configured to:
        arrange range-finding regions of which region sizes are different by hierarchizing thereof;
        select one or more range-finding regions in a predetermined order from the arranged range-finding regions; and
        perform a focusing operation by generating:
            a first evaluation value using one or more signals, from the imaging element, corresponding to each of the selected one or more range-finding regions; and
            a second evaluation value using one or more signals, from a source other than the imaging element, corresponding to predefined range-finding frames selected by a user; and
        a lens control unit configured to control a position of a focus lens based on the first evaluation value and the second evaluation value.

2. The imaging apparatus according to claim 1, wherein the one or more CPUs are configured to:
    select a range-finding region of which a region size is largest, first, from the arranged range-finding regions, and then select range-finding regions of other region sizes,
    control a position of the focus lens based on an evaluation value generated with respect to the range-finding region selected first, and
    control the position of the focus lens based on the evaluation value which is generated in each range-finding region which is selected thereafter.

3. The imaging apparatus according to claim 2,
    wherein the one or more CPUs are configured to select the one or more range-finding regions in order of the largest sized region as the predetermined order, and
    wherein the one or more CPUs are configured to control the position of the focus lens by generating an evaluation value every time a range-finding region is selected.

4. The imaging apparatus according to claim 2,
    wherein the one or more CPUs are configured to generate an evaluation value in each selected range-finding region, and
    control the position of the focus lens based on an evaluation value in a range-finding region of the smallest sized region.

5. The imaging apparatus according to claim 1, wherein the one or more CPUs are configured to:
    receive an operation from a user, and
    arrange the range-finding regions based on a position which is instructed by the user.

6. The imaging apparatus according to claim 1, wherein the one or more CPUs are configured to receive an operation from a user to cause the user to set one of the range-finding regions to the largest sized region.

7. The imaging apparatus according to claim 1, wherein the one or more CPUs are configured to generate the first evaluation value using the one or more signals of one or more focus detection pixels which are provided in the imaging element.

8. The imaging apparatus according to claim 1, wherein the one or more CPUs are configured to:
    arrange the range-finding regions of which region sizes are different by setting a range-finding region to the range-finding region of the largest sized region, and
    generate the second evaluation value using a detection signal which is generated in the source other than the imaging element when the range-finding region of the largest sized region is selected.

9. The imaging apparatus according to claim 1, wherein the one or more CPUs are configured to arrange the range-finding regions of which region sizes are different based on an image recognition result with respect to an image of a range-finding region of the largest sized region.

10. The imaging apparatus according to claim 1, further comprising:
    a display unit configured to display an image,
    wherein the one or more CPUs are configured to display the range-finding regions on the image which is displayed on the display unit, and display a range-finding region of the largest sized region, or a range-finding region of the smallest sized region.

11. The imaging apparatus according to claim 1, wherein, in case a movement of the imaging apparatus is detected while measuring a distance in a selected range-finding region, the one or more CPUs are configured to make the first evaluation value which is generated in the selected range-finding region invalid.

12. A focus control method comprising:
- arranging range-finding regions of which region sizes are different by hierarchizing thereof;
- selecting a range-finding region in a predetermined order from the arranged range-finding regions;
- performing a focusing operation by generating:
  - a first evaluation value using one or more signals, from the imaging element, corresponding to each of the selected one or more range-finding regions; and
  - a second evaluation value using one or more signals, from a source other than the imaging element, corresponding to predefined range-finding frames selected by a user; and
- controlling a position of a focus lens based on the first evaluation value and the second evaluation value.

13. A non-transitory computer-readable storage medium having stored thereon, a set of computer-executable instructions for causing a computer to execute steps comprising:
- arranging range-finding regions of which region sizes are different by hierarchizing thereof;
- selecting a range-finding region in a predetermined order from the arranged range-finding regions;
- performing a focusing operation by generating:
  - a first evaluation value using one or more signals, from the imaging element, corresponding to each of the selected one or more range-finding regions; and
  - a second evaluation value using one or more signals, from a source other than the imaging element, corresponding to predefined range-finding frames selected by a user; and
- controlling a position of a focus lens based on the first evaluation value and the second evaluation value.

* * * * *